United States Patent
Mikhaylov et al.

(10) Patent No.: US 10,198,432 B2
(45) Date of Patent: Feb. 5, 2019

(54) ASPECT-BASED SENTIMENT ANALYSIS AND REPORT GENERATION USING MACHINE LEARNING METHODS

(71) Applicant: ABBYY PRODUCTION LLC, Moscow (RU)

(72) Inventors: Maksim Borisovich Mikhaylov, Moscow (RU); Konstantin Alekseevich Pasechnikov, Moscow Region (RU)

(73) Assignee: ABBYY Production LLC, Moscow (RU)

(*) Notice: Subject to any disclaimer, the term of this patent is extended or adjusted under 35 U.S.C. 154(b) by 0 days.

(21) Appl. No.: 15/237,954

(22) Filed: Aug. 16, 2016

(65) Prior Publication Data

US 2018/0032507 A1   Feb. 1, 2018

(30) Foreign Application Priority Data

Jul. 28, 2016   (RU) .................... 2016131181

(51) Int. Cl.
*G06F 17/27* (2006.01)
*G06F 17/28* (2006.01)

(52) U.S. Cl.
CPC ...... *G06F 17/2785* (2013.01); *G06F 17/2735* (2013.01); *G06F 17/2755* (2013.01); *G06F 17/2881* (2013.01)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 6,092,059 A * 7/2000 Straforini ............. G06K 9/6292
706/10
7,792,841 B2   9/2010 McAllister et al.
(Continued)

FOREIGN PATENT DOCUMENTS

CA    2711665 A1   7/2009
WO   2009094664 A1   7/2009

OTHER PUBLICATIONS

Nguyen et al., Aspect-Based Sentiment Analysis Using Tree Kernel Based Relation Extraction, 2015, Springer, Part II, LNCS 9042, pp. 114-125.*

(Continued)

*Primary Examiner* — Lamont M Spooner
(74) *Attorney, Agent, or Firm* — Lowenstein Sandler LLP

(57) ABSTRACT

Systems and methods for aspect-based sentiment analysis using machine learning methods. An example method comprises: receiving, by a computer system, a custom dictionary comprising a list of lexemes referencing at least one of: a target entity or an aspect associated with the target entity; performing, using the custom dictionary, a syntactico-semantic analysis of at least part of a natural language text to produce a plurality of syntactico-semantic structures representing the part of the natural language text; evaluating, using one or more text characteristics produced by the syntactico-semantic analysis, a classifier function to determine polarities associated with one or more aspect terms; and generating a report comprising the aspect terms and polarities of aspects referenced by the aspect terms.

20 Claims, 21 Drawing Sheets

(58) Field of Classification Search
CPC .. G06F 17/272; G06F 17/2725; G06F 17/273;
G06F 17/2735; G06F 17/274; G06F
17/2745; G06F 17/275; G06F 17/2755;
G06F 17/276; G06F 17/2765; G06F
17/2795
USPC .................................................. 704/1, 9, 10
See application file for complete search history.

(56) References Cited

U.S. PATENT DOCUMENTS

| | | | |
|---|---|---|---|
| 8,041,669 B2 | 10/2011 | Nigam et al. | |
| 8,650,023 B2 | 2/2014 | Brun | |
| 8,671,098 B2 | 3/2014 | Salvetti et al. | |
| 8,706,503 B2* | 4/2014 | Cheyer | G06F 17/3087 704/275 |
| 8,799,773 B2 | 8/2014 | Reis et al. | |
| 8,949,211 B2 | 2/2015 | Lu et al. | |
| 9,015,168 B2 | 4/2015 | Cai et al. | |
| 9,129,008 B1 | 9/2015 | Kuznetsov | |
| 9,177,554 B2 | 11/2015 | Bhatt et al. | |
| 9,633,007 B1* | 4/2017 | Brun | G06F 17/2785 |
| 9,690,772 B2* | 6/2017 | Brun | G06F 17/2785 |
| 9,922,642 B2* | 3/2018 | Pitschel | G10L 15/063 |
| 9,934,775 B2* | 4/2018 | Raitio | G10L 13/10 |
| 2006/0069589 A1 | 3/2006 | Nigam et al. | |
| 2007/0282867 A1 | 12/2007 | McAllister et al. | |
| 2008/0154847 A1* | 6/2008 | Chellapilla | G06Q 30/02 |
| 2008/0249764 A1 | 10/2008 | Huang et al. | |
| 2009/0193328 A1 | 7/2009 | Reis et al. | |
| 2011/0093417 A1 | 4/2011 | Nigam et al. | |
| 2012/0197903 A1 | 8/2012 | Lu et al. | |
| 2013/0024183 A1 | 1/2013 | Cardie et al. | |
| 2014/0289253 A1 | 9/2014 | Natarajan et al. | |
| 2016/0104075 A1* | 4/2016 | Chowdhury | G06F 17/2785 706/12 |
| 2016/0171386 A1* | 6/2016 | Brun | G06F 17/2785 706/12 |
| 2016/0260108 A1* | 9/2016 | Bracewell | G06Q 30/0201 |
| 2018/0053107 A1* | 2/2018 | Wang | G06N 3/084 |
| 2018/0060305 A1* | 3/2018 | Deleris | G06F 17/2785 |

OTHER PUBLICATIONS

Liu, Bing, "Sentiment Analysis and Opinion Mining", Apr. 22, 2012, 168 pages.

* cited by examiner

I've been using the iPhone 4 (Verizon) for about a month now. Prior, I had an HTC Droid Incredible for 2 years and before that, a Blackberry Curve--so my vantage point for comparing the iPhone to other smartphones is pretty good.
First APPEARANCE (characteristic)... the phone is *sleek and beautiful*. The materials Apple used for this phone put all of my previous phones to shame. They now feel cheap, like a dumpy car next to a Lexus. KEYBOARD: the phone has an *excellent* virtual keyboard (component) --*much better than the Androids*. But, of course, there's nothing like an actual QUERTY keyboard. On the iPhone 4, I can type (function) *quickly and accurately* most of the time. It *doesn't have a built in mouse* (like my Droid Incredible did), so *you have less control of the cursor's position*, but there is something *wonderful* about the screen (component) that I can't describe. The auto-correct (function) is also *incredibly intuitive at fixing typos*. WEB BROWSING (function): *excellent but equal to the android*. APP STORE (component): Apple charges for many of the applications that Android gives away for free, but the App Store *has a nice selection* and *most of the apps work well*. With the Android App Store, you sometimes get apps that totally don't work or force-close all the time. CUSTOMIZATION (function): yes, it's true--the Android gives you a zillion times more control over customizing your phone. For 2 years, I goofed around with all the layout options. And now, after one month of having a pretty fixed iPhone setup, I've come to the following conclusion. "Who cares?!" The iPhone *has such a nice and easy-to-use* layout (component) *that there's really not much need to change it around*. BATTERY LIFE (характеристика): *It's not bad*. If you keep the Location services shut off and close down applications when not in use, the battery (component) *can give you a decent run for your money*.

Fig. 2

```
510
this
<:Aspect_Cars_Imp>
=>
Aspect I (this),
annotation(I,this.core),
I.aspect_type=='implicit',
I.term_constituent == this.core;
```

```
520
this
<:Aspect>
~<Aspect_Cars_Imp>
=>
Aspect A (this),
annotation (A,this.core),
A.aspect_type == 'exp',
A.term_constituent == this.core;
```

```
530
<%Aspect,aspect_type=='exp%>
[ !a ~<Controlled> <%Aspect,aspect_type=='exp%>
[ ?p "PREPOSITION"|"COORDINATING_CONJUNCTIONS"]
]
=>
anchor(this.o,a,NoDistribution),
annotation(this.o,a.core,p.core),
this.o.term_constituent == a.core,
this.o.term_constituent == p.core;

<%Aspect,aspect_type=='exp%>
<%Aspect,aspect_type=='exp%>
anchorsIntersection()
```

```
540
"ache:TO_ACHE" | "tire:TIREDNESS"|
"beat:TO_BEAT"
[
   In "PARTS_OF_BODY"
]
=>
Aspect A(this),
annotation(A,this.core,n.core),
A.aspect_type=='fact',
A.aspect_sentiment=='negative',
A.term_constituent == n.core,
A.term_constituent == this.core;
```

```
550
f ~<%Aspect%>
"demand:TO_DEMAND" | ("DEBITATIVE" ~<Adjective>)|
"force:FORCIBLE"
[
   this "change:TO_CHANGE" |
   ("TO_SUBSTITUTE_AND_EXCHANGE"
   ~<<Possibilitive_Lexical>> ~<<Impossibilitive_Lexical>>
   ~<<Special>>) ~<%Aspect%>
   ~[]
]
=>
Aspect A(f),
annotation(A,this.core,f.core),
A.aspect_type=='fact',
A.term_constituent == f.core,
A.term_constituent == this.core;
```

610 this <%Aspect, aspect_type=='explicit',aspect_sentiment == null%>|
<%Aspect,aspect_type=='exp',aspect_sentiment ==
null%> ~<%Sentiment:ObjectOfSentimentRole%>
[Ch_Evaluation:
"good_bad:GOOD_BAD"|"excellent:GOOD_BAD" <<PolarityPlus>>|<<NonPolari tyMinus>>]|
[$Object_Indirect_$es:
"complaint:COMPLAINT"|"issue:PROBLEM_AS_QUESTION" ]
=>
this.o.aspect_sentiment == 'positive';
x
[this
{ ( "fly:TO_FLY" <<From_Depart>>|<<Inchoative>>| <<Down>>| <<Apart>> )
| ( "comfort:COMFORT" <<NonPolarityPlus>> )
| ( "convenient:CONVENIENT" <<PolarityMinus>> )
| ( "sophisticated:SOPHISTICATED" <<PolarityMinus>> )
| "gluttonous:GLUTTONOUS"
| ( "well_thought:WELL_WEIGHED" <<NonPolarityPlus>> )
| ( "practical:PRACTICAL" <<NonPolarityPlus>> )
| ( "obedient:OBEDIENCE" <<PolarityMinus>> )
| ( "durable:DURABILITY" <<PolarityPlus>> )
| ( "DANGER_SAFETY" <<PolarityMinus>>|<<NonPolarityPlus>> )
| ( "reliable:TO_TRUST_AND_RELY" <<Impossibilitive_Lexical>> )
| ( "PROFITABLENESS" <<PolarityMinus>>|<<NonPolarityPlus>> )
| ( "INFORMATIVE" <<PolarityMinus>> )
| ( "QUALITY_CLASSIFICATION" <<PolarityPlus>> )
| "linger:TO_HURRY_TO_TARRY"
| "SORRY_STATE"
| "ENGINE_KNOCK"
| "BAG_AS_PLACE"
| "TO_STOP_FUNCTIONING"
| "tarry:TO_HURRY_TO_TARRY"
| "shake:TO_SHAKE"
| "shut:TO_GO_AND_TRANSFER"
| "tight:TIGHT_SLACK"
| "bench:BENCH"
| "unseal:TO_UNSEAL_AS_TO_OPEN"
| "DEFECT"
| "CRACKING_TERMS"
| ( "haunting:TO_BOTHER" <<PolarityMinus>> )
| "rigid:RIGIDITY"
| "bowl:BOWL"
| ( "everyday:DEMAND_FOR_GOODS" <<PolarityMinus>> )
| "unmanageable:MANAGEABLE_UNMANAGEABLE"
| ( "capricious:DELICATE_ABOUT_PLANT" <<PolarityPlus>> )
| "indent:INDENTATION"
| "TO_LIST_AS_BEND_ABOUT_SHIP"
| ( "pleasant:PLEASURE" <<PolarityMinus>> )
| "beat:BEATING_SOUND"
| "patch:PATCH"
| "grey:PATCH"
| "crack:TO_BREAK"
| "burst:TO_BREAK"
| "crawl:MOTION_BY_SPEED"
| "cold:TEMPERATURE"
| "thrust:TO_BREAK_WITH_PHYSICAL_EFFORT"
| ( "gracious:GRACEFUL" <<NonPolarityPlus>> )
| "oxidate:OXIDATION"
| "rust:TO_RUST"
| "bend:TO_BEND"
| "howl:HOWLS_OF_NON_ANIMATE_THINGS"
| "roar:ROAR_OF_NON_ANIMATE_THINGS"
| "leak:TO_ALLOW_LIQID_COME_OUT"
| ( "strong:WEAK_STRONG" <<NonPolarityPlus>> )
| "bore:TO_CREATE_HOLE"
| ( "rossy:ROSY" <<PolarityPlus>> )
| "fragile:FRAGILE"
<%Aspect, aspect_type=='implicit'%>
]
{
[this <<Negative>>|<<NonPredicativeNegative>>]
=>
this.o.as_aux='positive';
[this ~<<Negative>> ~<<NonPredicativeNegative>>]
=>
this.o.as_aux='negative';
<Verb>|<Num>
"absent:EXISTENCE_AND_POSSESSION" |
"absent:POSITION_IN_SPACE"
| ( "be:EXISTENCE_AND_POSSESSION" <<Negative>>| <<SocialStatusLow>> )
)
<%Aspect,aspect_type=='fact'%>
[
If <%Aspect,aspect_type=='explicit'%> |
<%Aspect,aspect_type=='implicit',as_aux=='positive'%> |
<%Aspect,aspect_type='exp'%>
]
=>
this.o.aspect_sentiment=='negative',
f.o.aspect_sentiment=='negative';

AUDI 100 C4 sedan
Having recently bought this car, I am very very happy about it. It has a 2.5 liter turbo-diesel engine. The previous owner assured me of the low oil and fuel appetite of the car and said that "she flies mad rather than drives." All that turned out to be true. My usual cruising speed is 140 km/h. I would say that the Germans know how to make cars. This car holds the road perfectly due to its reasonably wide body. The brakes are all disc. The most important feature is the front wheel drive, unlike many other German cars, such as Mercedes and BMW of the same class. The car is very roomy: even five adult passengers may sit there comfortably. The trunk is of an enormous size, it has even accommodated a washer once. By the price/performance ratio, it is an excellent car. I would never drive a domestically-manufactured car again, and I recommend Audi to everyone!

Fig. 8

```
General" from="19" mark="Rel" sentiment="neutral" term="car" to="29" type="explicit"/>
General" from="31" mark="Rel" sentiment="positive" term="she" to="35" type="explicit"/>
Driveability" from="46" mark="Rel" sentiment="neutral" term="2.5 liter engine" to="65" type="explicit"/>
Driveability" from="67" mark="Rel" sentiment="neutral" term="turbodiesel" to="78" type="explicit"/>
Driveability" from="125" mark="Rel" sentiment="positive" term="low appetite" to="132" type="fct"/>
Driveability" from="134" mark="Rel" sentiment="positive" term="fuel" to="141" type="explicit"/>
Driveability" from="148" mark="Rel" sentiment="positive" term="flies mad" to="166" type="fct"/>
Driveability" from="204" mark="Rel" sentiment="positive" term="cruising speed" to="224" type="explicit"/>
Whole" from="252" mark="Rel" sentiment="positive" term="cars" to="262" type="explicit"/>
Driveability" from="264" mark="Rel" sentiment="positive" term="holds the road" to="277" type="explicit"/>
Driveability" from="306" mark="Rel" sentiment="positive" term="wide body" to="320" type="explicit"/>
Driveability" from="322" mark="Rel" sentiment="neutral" term="breaks" to="329" type="explicit"/>
Driveability" from="334" mark="Rel" sentiment="neutral" term="disc" to="342" type="explicit"/>
Driveability" from="352" mark="Rel" sentiment="neutral" term="front-wheel drive" to="367" type="explicit"/>
Driveability" from="392" mark="Cmpr" sentiment="positive" term="German cars" to="414" type="explicit"/>
Driveability" from="427" mark="Cmpr" sentiment="neutral" term="Mercedes" to="435" type="explicit"/>
Driveability" from="438" mark="Cmpr" sentiment="neutral" term="BMW" to="441" type="explicit"/>
Comfort" from="459" mark="Rel" sentiment="positive" term="roomy" to="477" type="explicit"/>
Comfort" from="491" mark="Rel" sentiment="positive" term="comfortably" to="499" type="fct"/>
Comfort" from="541" mark="Rel" sentiment="positive" term="trunk" to="559" type="explicit"/>
Costs" from="603" mark="Rel" sentiment="positive" term="price/performance ratio" to="630" type="explicit"/>
Costs" from="641" mark="Rel" sentiment="positive" term="car" to="651" type="explicit"/>
Whole" from="684" mark="Irr" sentiment="negative" term="domestically-manufactured car" to="705" type="explicit"/>
Whole" from="723" mark="Rel" sentiment="positive" term="Audi" to="727" type="explicit"/>
```

| This | boy | is | smart | , | he' | ll | succeed | in | life |
|---|---|---|---|---|---|---|---|---|---|
| this <Pronoun, GTNoun, PersonThird> | boy <Noun, Masc, Nominativ, GTNoun, Singular> | be <Verb, GTVerb, Singular, PersonThird, ZeroType, Present, Nonnegative, NoCompositeness> | smart <Adjective, DegreePositive, GTAdjectiveAttr, FullComparison> | | he <Pronoun, Nominative \| Accusative, GTNoun, Masculine, Singular, PersonThird, RCPersonal, Unreflexive> | shall <Verb, GTVerbModal, ZeroType, Present, Nonnegative, Composite_ll> | succeed <Verb, GTInfinitive, NumberZero, PersonZero, ZeroType, TenseZero, Nonnegative> | in <Adverb, GTAdverb> | life <Adjective, DegreePositive, GTAdjectiveAttr> |
| this <Invariable> | | be <Verb, GTVerb, Singular, PersonThird, ZeroType, Present, Nonnegative, Regular, Composite_for_t> | smart <Verb, GTVerb, Singular, PersonFirst \| PersonSecond, ZeroType, Present, Nonnegative, NoCompositeness> | | | will <Verb, GTVerbModal, ZeroType, Present, Nonnegative, Irregular, Composite_ll> | succeed <Verb, GTVerb, Singular, PersonFirst \| PersonSecond, ZeroType, Present, Nonnegative, NoCompositeness> | in <Preposition> | life <Noun, Nominative \| Accusative, GTNoun, Singular> |
| this <Pronoun, GTAdjectiveAttr, Singular, RCDemonstrative> | | | smart <Verb, GTVerb, Plural, ZeroType, Present, Nonnegative, NoCompositeness> | | | | succeed <Verb, GTInfinitive, NumberZero, PersonZero, ZeroType, TenseZero, Nonnegative> | | |
| | | | smart <Verb, GTInfinitive, NumberZero, PersonZero, ZeroType, TenseZero, Nonnegative> | | | | | | |
| | | | smart <Adverb, DegreePositive, GTAdverb, FullComparison> | | | | | | |
| | | | smart <Noun, Nominative \| Accusative, GTNoun, Singular> | | | | | | |

ASPECT-BASED SENTIMENT ANALYSIS AND REPORT GENERATION USING MACHINE LEARNING METHODS

CROSS REFERENCE TO RELATED APPLICATIONS

The present application claims the benefit of priority under 35 U.S.C. 119 to Russian Patent Application No. 2016131181, filed Jul. 28, 2016; the disclosure of which is herein incorporated by reference in its entirety for all purposes.

TECHNICAL FIELD

The present disclosure is generally related to extracting information from natural language texts executed by computer systems, and is more specifically related to aspect-based sentiment analysis using machine learning methods.

BACKGROUND

Sentiment analysis is one of the important operations in automated processing of natural language texts and has a wide range of real world applications. Aspect-based sentiment analysis (ABSA) may be employed to automatically identify, in a natural language text, the aspects of given target entities and the sentiment expressed towards each aspect.

SUMMARY OF THE DISCLOSURE

In accordance with one or more aspects of the present disclosure, an example method for aspect-based sentiment analysis may comprise: receiving, by a computer system, a custom dictionary comprising a list of lexemes referencing at least one of: a target entity or an aspect associated with the target entity; performing, using the custom dictionary, a syntactico-semantic analysis of at least part of a natural language text to produce a plurality of syntactico-semantic structures representing the part of the natural language text; evaluating, using one or more text characteristics produced by the syntactico-semantic analysis, a classifier function to determine polarities associated with one or more aspect terms; and generating a report comprising the aspect terms and polarities of aspects referenced by the aspect terms.

In accordance with one or more aspects of the present disclosure, an example system for aspect-based sentiment analysis may comprise a memory and a processor, coupled to the memory, the processor configured to: receive a custom dictionary comprising a list of lexemes referencing at least one of: a target entity or an aspect associated with the target entity; perform, using the custom dictionary, a syntactico-semantic analysis of at least part of a natural language text to produce a plurality of syntactico-semantic structures representing the part of the natural language text; evaluate, using one or more text characteristics produced by the syntactico-semantic analysis, a classifier function to determine polarities associated with one or more aspect terms; and generate a report comprising the aspect terms and polarities of aspects referenced by the aspect terms.

In accordance with one or more aspects of the present disclosure, an example computer-readable non-transitory storage medium may comprise executable instructions that, when executed by a computer system, cause the computer system to: receive a custom dictionary comprising a list of lexemes referencing at least one of: a target entity or an aspect associated with the target entity; perform, using the custom dictionary, a syntactico-semantic analysis of at least part of a natural language text to produce a plurality of syntactico-semantic structures representing the part of the natural language text; evaluate, using one or more text characteristics produced by the syntactico-semantic analysis, a classifier function to determine polarities associated with one or more aspect terms; and generate a report comprising the aspect terms and polarities of aspects referenced by the aspect terms.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 illustrates an example natural language text for processing by the example method for aspect-based sentiment analysis, in accordance with one or more aspects of the present disclosure;

FIG. 5 illustrates examples of production rules employed by the example method for aspect-based sentiment analysis to identify aspect terms, in accordance with one or more aspects of the present disclosure;

FIG. 6 illustrates examples of production rules employed by the example method for aspect-based sentiment analysis to determine aspect term polarity, in accordance with one or more aspects of the present disclosure;

FIG. 8 illustrates an example natural language text for processing by the method for aspect-based sentiment analysis, in accordance with one or more aspects of the present disclosure;

FIG. 9 illustrates results of an example tagging of the text illustrated on FIG. 8, in accordance with one or more aspects of the present disclosure;

FIG. 11 schematically illustrates an example of a lexico-morphological structure of a sentence, in accordance with one or more aspects of the present disclosure;

DETAILED DESCRIPTION

Figure 1:
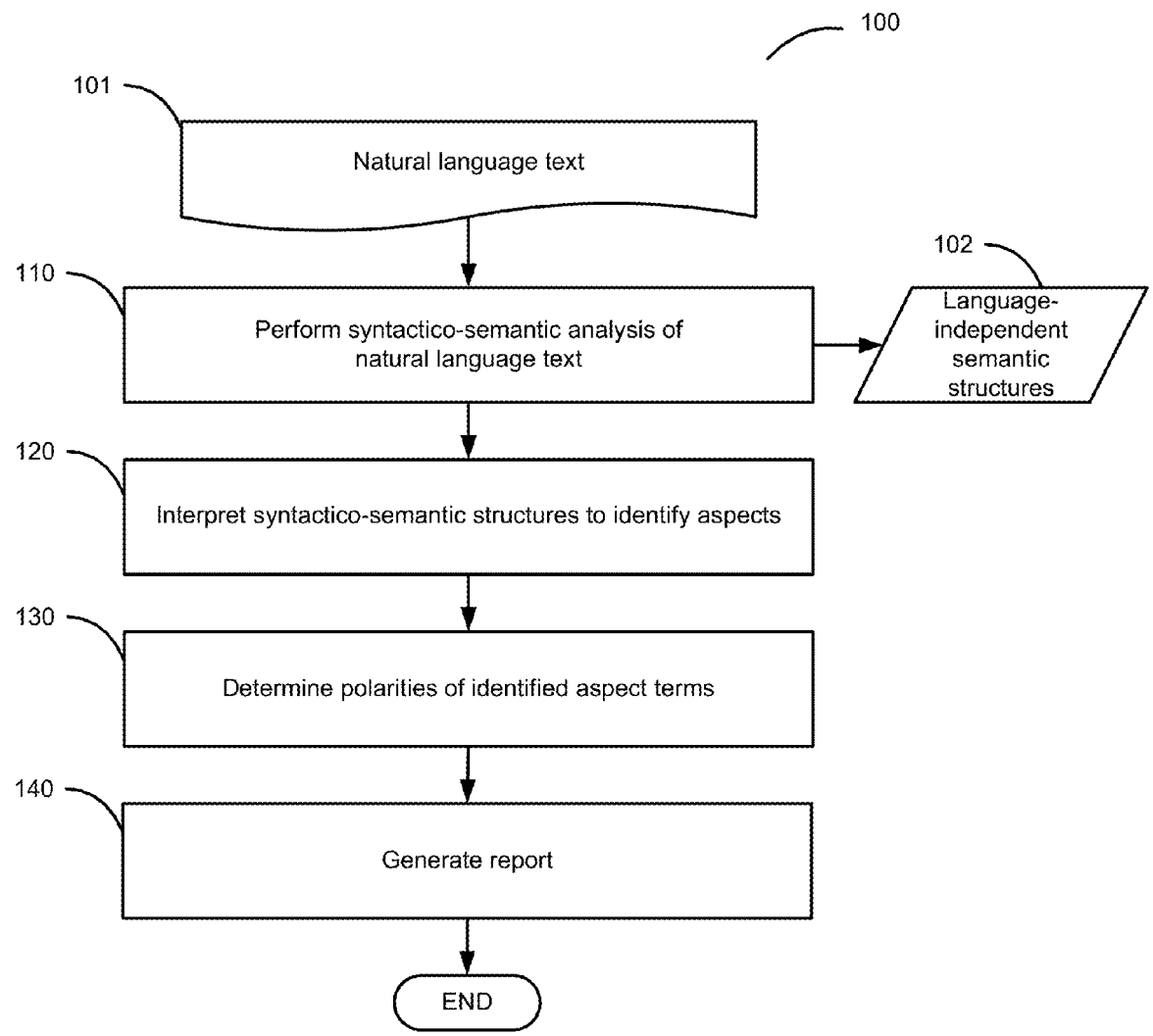
FIG. 1 depicts a flow diagram of an example method for aspect-based sentiment analysis, in accordance with one or more aspects of the present disclosure.

Described herein are methods and systems for aspect-based sentiment analysis. The systems and methods described herein may be employed in a wide variety of natural language processing applications, including machine translation, semantic indexing, semantic search (including multi-lingual semantic search), document classification, e-discovery, etc.

"Computer system" herein shall refer to a data processing device having a general purpose processor, a memory, and at least one communication interface. Examples of computer systems that may employ the methods described herein include, without limitation, desktop computers, notebook computers, tablet computers, and smart phones.

"Sentiment" herein shall refer to a verbal expression of the protagonist's attitude or emotion toward a certain entity (e.g., a real world object or a class of real word objects). Certain natural language texts may express the protagonist's sentiments towards various aspects of one or more entities. "Aspect" herein shall refer to a certain feature of the entity being described by the natural language text. In various illustrative examples, an aspect may identify a characteristic, a component, or a function of the corresponding entity. "Aspect term" herein shall refer to one or more natural language words referencing an aspect of a certain entity. A sentiment may be characterized by the polarity associated with the corresponding aspect term, e.g., positive, neutral, or negative.

In an illustrative example, a manufacturer of consumer goods or a service provider may be interested in gauging the consumers' sentiments towards a certain product, by analyzing the consumers' online reviews, which may take form of unstructured or weakly structured texts. In accordance with one or more aspects of the present disclosure, a computer system may analyze the natural language text representing the consumers' reviews in order to identify the aspect terms associated with one or more target entities (e.g., goods or services) and to further identify the sentiment expressed by the consumers towards each aspect.

In certain implementations, the computer system implementing the methods described herein may perform a two-stage aspect-based sentiment analysis, in which the first stage identifies the aspect terms, and the second stage determines their polarities.

The first stage of the process may analyze a natural language text that may represent a plurality of consumer reviews of one or more target entities (e.g., consumer goods or services). The analysis may involve evaluating a set of production rules to interpret a plurality of syntactico-semantic structures yielded by the syntactico-semantic analysis of the natural language text. The production rules may yield a plurality of data objects representing the identified aspects of the target entities, as described in more details herein below.

The second stage of the process determines a polarity associated with each identified aspect term. In certain implementations, the second stage may involve evaluating one or more classifier functions yielding the polarity associated with a given aspect term. The classifier functions may implement various machine learning methods, such as linear classifiers, linear tree classifiers, random forest classifiers, conditional random field (CRF) classifiers, latent Dirichlet allocation (LDA) classifiers, support vector machine (SVM) classifiers, and/or neural network-based classifiers (such as Word2Vec), as described in more details herein below.

Additionally or alternatively, the polarity associated with a given aspect term may be determined by applying a set of production rules that interpret a plurality of syntactico-semantic structures yielded by the syntactico-semantic analysis of the natural language text, as described in more details herein below.

Various aspects of the above referenced methods and systems are described in details herein below by way of examples, rather than by way of limitation.

FIG. 1 depicts a flow diagram of an example method 100 for aspect-based sentiment analysis of a natural language text, in accordance with one or more aspects of the present disclosure. Method 100 and/or each of its individual functions, routines, subroutines, or operations may be performed by one or more processors of the computer system (e.g., computer system 100 of FIG. 1) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

At block 110, the computer system implementing method 100 may perform a syntactico-semantic analysis of an input natural language text 101, which may represent, e.g., one or more consumer reviews of one or more target entities (e.g., consumer goods or services). FIG. 2 illustrates an example natural language text 211 representing a consumer's review of a smartphone. In various illustrative examples, a consumer review may not necessarily include the identifier of the target entity (e.g., make and model of a particular device), however, that association may be inferred from the metadata associated with the consumer review (e.g., the review may be associated with a category having a title that identifies the target entity).

In various illustrative examples, the natural language text may be represented by an unstructured (free form narrative) or a weakly structured text (e.g., a text subdivided into several sections identified by subheadings such as "Product characteristics," "Advantages," "Shortcomings," etc.).

The syntactico-semantic analysis may produce, for each sentence of the natural language text, at least one language-independent semantic structure 102, as described in more details herein below with references to FIGS. 5-15. In certain implementations, the syntactico-semantic analysis may utilize a custom dictionary which may comprise a list of lexemes that can be used in the natural language text being analyzed to refer to the target entities (e.g., consumer goods or services). In an illustrative example, the custom dictionary may include a list of automobile makes including possible colloquial variations, such as "Chevrolet" and "Chevy."

Figure 3:
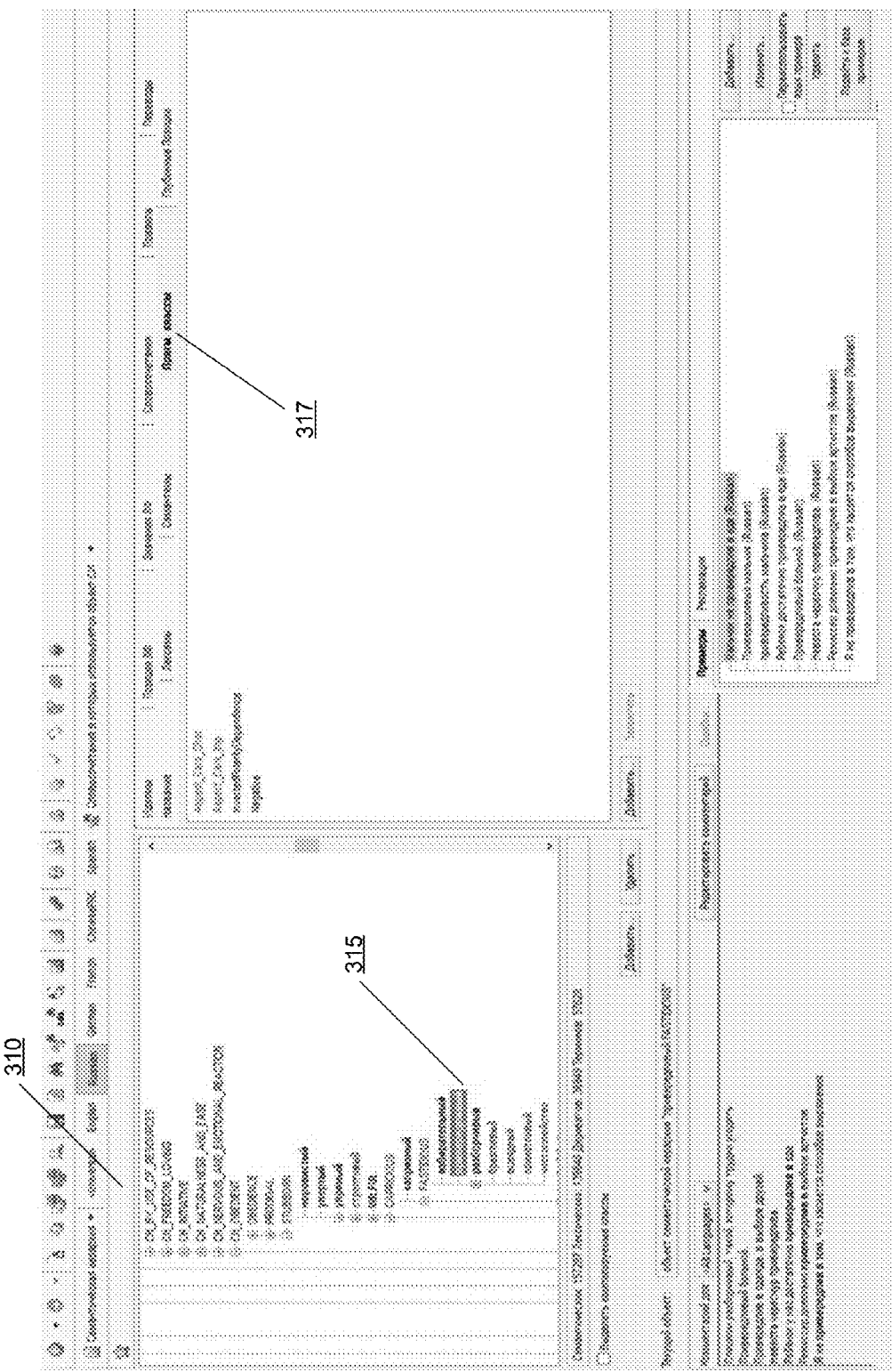
FIG. 3 illustrates an example semantic hierarchy utilized by the example method for aspect-based sentiment analysis, in accordance with one or more aspects of the present disclosure.

In certain implementations, the custom dictionary may be represented by a semantic hierarchy. As schematically illustrated by FIG. 3, an example semantic hierarchy 310 may comprise definitions of a plurality of semantic classes, such that each class corresponds to a concept of the subject area. Each class definition may comprise definitions of one or more objects associated with the class, including language-specific lexical classes.

In order to facilitate identification of aspect terms in the natural language text being analyzed, the semantic hierarchy employed by the syntactico-semantic analysis of the natural language text may be extended by associating certain lexical classes 315 with custom pragmatic classes 317 indicating that lexemes represented by the instances of such a lexical class may be utilized as aspect terms for denoting a specified aspect. In certain implementations, the custom pragmatic class may have several sub-classes to further indicate the type of aspect referenced by lexemes represented by the instances of the associated lexical class. In various illustrative examples, the sub-classes of the custom pragmatic class may indicate that a lexeme represented by an instance of the associated lexical class represents a characteristic, a component, or a function of the corresponding entity. In another illustrative example, a sub-class of the custom pragmatic class may indicate that a lexeme represented by an instance of the associated lexical class reflects a characteristic, a component, or a function of the corresponding entity in an implicit manner, such that the polarity may be implied from the aspect term itself (e.g., "high rounds-per-minute (RPM)"). Otherwise, if the polarity is not determined by the aspect term and may only be identified by analyzing the context of the aspect term, the aspect term may be referred to as an "explicit" one.

At block 120, the computer system may interpret the plurality of syntactico-semantic structures using a set of production rules to identify certain aspects of the target entities, as described in more details herein below with references to FIGS. 4-5.

At block 130, the computer system may determine polarities of the identified aspect terms. In an illustrative example, the polarity may be negative (−1), neutral (0), or positive (+1). In various other illustrative examples, other numeric scales and/or verbal designators of the polarities may be utilized.

In certain implementations, the polarity may be determined by applying a set of production rules that interpret a plurality of syntactico-semantic structures yielded by the syntactico-semantic analysis of the natural language text. FIG. 6 illustrates examples of production rules that may be employed to determine aspect term polarity, in accordance with one or more aspects of the present disclosure. Additionally or alternatively, the polarity may be determined by evaluating one or more classifier functions yielding the polarity of each identified aspect term, as described in more details herein below.

At block 140, the computer system may aggregate the extracted information in a form suitable for rendering via a graphical user interface (GUI) and/or printing. In an illustrative example, the report generated by the system may comprise the identifier of the target entity (e.g., an electronic device), and one or more hierarchical lists identifying the components, characteristics, and/or functions of the target entity. Each hierarchical list may comprise a plurality of aspect terms and their associated polarities. In certain implementations, each hierarchical list may further comprise the number of instances (e.g., the number of online reviews), in which the identified aspect has been characterized by the identified aspect term and the identified polarity. Responsive to completing the operations described with reference to block 140, the method may terminate.

Figure 4:
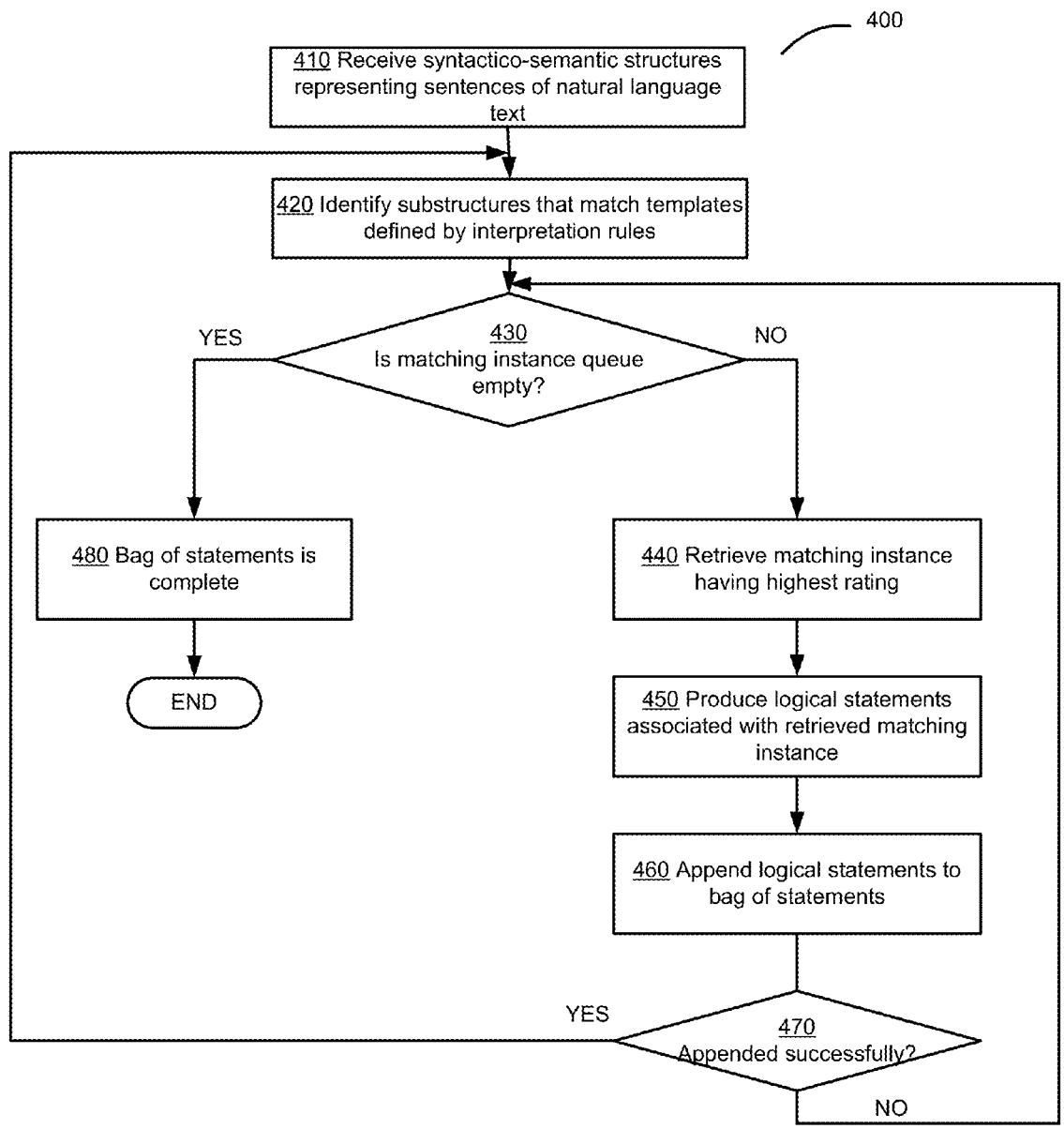
FIG. 4 schematically illustrates an example method for interpreting syntactico-semantic structures using a set of production rules, in accordance with one or more aspects of the present disclosure.

FIG. 4 schematically illustrates an example method for interpreting semantic structures using a set of production rules, in accordance with one or more aspects of the present disclosure. Method 400 and/or each of its individual functions, routines, subroutines, or operations may be performed by one or more processors of the computer system (e.g., computer system 400 of FIG. 4) implementing the method. In certain implementations, method 400 may be performed by a single processing thread. Alternatively, method 400 may be performed by two or more processing threads, each thread implementing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

In certain implementations, the data objects representing the identified aspects of the target entities may be represented by a Resource Description Framework (RDF) graph. The Resource Description Framework assigns a unique identifier to each informational object and stores the information regarding such an object in the form of SPO triplets, where S stands for "subject" and contains the identifier of the object, P stands for "predicate" and identifies some property of the object, and O stands for "object" and stores the value of that property of the object. This value can be either a primitive data type (string, number, Boolean value) or an identifier of another object. In an illustrative example, an SPO triplet may associate a token of the natural language text with an aspect of a target entity.

The production rules employed for interpreting the syntactico-semantic structures may comprise interpretation rules and identification rules. An interpretation rule may comprise a left-hand side represented by a set of logical expressions defined on one or more syntactico-semantic structure templates and a right-hand side represented by one or more statements regarding the informational objects representing the entities referenced by the natural language text.

A syntactico-semantic structure template may comprise certain syntactico-semantic structure elements (e.g., to ascertain the presence of a certain grammeme or semanteme, association with a certain lexical/semantic class, association with a certain surface or deep slot, etc.). The relationships between the syntactico-semantic structure elements may be specified by one or more logical expressions (conjunction, disjunction, and negation) and/or by operations describing mutual positions of nodes within the syntactico-semantic tree. In an illustrative example, such an operation may verify whether one node belongs to a subtree of another node.

Matching the template defined by the left-hand side of a production rule to a syntactico-semantic structure representing at least part of a sentence of the natural language text may trigger the right-hand side of the production rule. The right-hand side of the production rule may associate one or more attributes (reflecting lexical, syntactic, and/or semantic properties of the words of an original sentence) with the informational objects represented by the nodes. In an illustrative example, the right-hand side of an interpretation rule may comprise a statement associating a token of the natural language text with an aspect of a target entity.

An identification rule may be employed to associate a pair of informational objects which represent the same real world entity. An identification rule is a production rule, the left-hand side of which comprises one or more logical expressions referencing the semantic tree nodes corresponding to the informational objects. If the pair of informational objects satisfies the conditions specified by the logical expressions, the informational objects are merged into a single informational object.

Referring to FIG. 4, at block 410, the computer system implementing method 400 may receive a plurality of syntactico-semantic structures representing the sentences of the natural language text being analyzed.

At block 420, the computer system may identify a plurality of syntactico-semantic sub-structures that match the templates defined by the left-hand side of the interpretation rules employed to analyze the natural language text.

At blocks 430-450, the computer system may iterate through the identified matching instances that may be arranged in a queue and associated with priority ratings (e.g., based on priority ratings associated with the interpretation rules that triggered the respective matching instances). At block 430, the computer system may ascertain whether the matching instances queue is empty, in which case the method may branch to block 470; otherwise, at block 440, the computer system may retrieve, from the queue, the matching instance having the highest rating.

At block 450, the computer system may produce one or more logical statements defined by the right-hand side of the interpretation rules that have triggered the highest priority matching instance identified at block 340.

At block 460, the computer system may append the logical statements to a bag of statements associated with the natural language text being analyzed. "Bag of statements" herein shall refer to a set of non-contradictory logical statements characterizing the extracted informational objects and their properties. Therefore, an attempt would fail to append, to a bag of statements, a new statement contradicting at least one statement that is already contained in the bag of statements.

Responsive to determining, at block 470, that an attempt has failed to add, to the bag of statements associated with the natural language text being analyzed, the logical statements produced at block 450, the method may loop back to block 430; otherwise, the method may loop back to block 420.

At block 480, responsive to determining that the matching instances queue is empty, the method may terminate by declaring the bag of statements being complete. The bag of statements may define an RDF graph representing the identified aspect terms. In certain implementations, the computer system may merge certain identified aspects that in the input natural language text may be referred to using various synonymic constructs.

FIG. 5 illustrates example production rules that may be employed to identify aspect terms, in accordance with one or more aspects of the present disclosure. Rule 510 may be employed to identify an implicit aspect. Rule 520 may be employed to identify an implicit aspect. Rule 530 may be employed to merge to explicit aspects. Rule 540 may be employed to identify an implicit aspect represented by the consumer's indication that using the product had caused a back pain. Rule 550 may be employed to identify an implicit aspect represented by the consumer's indication that a part of the product needed to be replaced.

FIG. 6 illustrates several an example production rule that may be employed to determine aspect term polarity, in accordance with one or more aspects of the present disclosure. Rule 610 may be employed to identify polarities associated with several aspects related to passenger vehicles.

As noted herein above, in addition to or as an alternative to utilizing the production rules, the aspect term polarity may be determined by evaluating one or more classifier functions. The classifier function domain may be represented by a vector of values of grammatical, syntactic, and/or semantic attributes characterizing the aspect term. The base syntactico-semantic structure constituent representing the aspect term may be selected as the highest constituent in the syntactico-semantic structure, the kernel of which is comprised by the aspect term. The context of the identified base constituent may be represented by the parent, child, and sibling constituents.

In various illustrative examples, the attributes representing the classifier function domain may include:

- a semantic class associated with the identified based constituent representing the aspect term (e.g., HUMAN, BE, EMOTINOS_AND_TH EMOTIONAL_ATTITUDE, INSIDE_PART);
- a pragmatic class associated with the identified based constituent representing the aspect term (e.g., DigitalNumbers, Person, Positive, NormalPolarityDependence);
- a language-independent deep slot associated with the identified based constituent representing the aspect term;
- a language-specific surface slot associated with the identified based constituent representing the aspect term;
- a syntactic paradigm associated with the identified based constituent representing the aspect term, i.e., a plurality of surface structures which are associated with a certain lexical values (e.g., parts of speech);
- a semanteme associated with the aspect term (e.g., PolarityPlus, NonPolarityMinus);
- a capitalization template specifying the usage of capital letters in the aspect term (e.g., AaAaA, AAAA); and/or
- a position of the identified based constituent in the syntactico-semantic tree (e.g., whether the base constituent is a collocation root, or a left descendent of a specified semantic tree vertex).

In certain implementations, the attribute values may be binarized before being fed to a classifier function. In an illustrative example, the binarization procedure involves representing N values of a given attribute as N binary attributes. In certain implementations, the resulting binary attributes may be filtered (e.g., by the Fisher's exact test or using the Shannon entropy) in order to select a smaller number of the most statistically significant attributes.

Certain parameters of such classifier functions may be adjusted by machine learning methods that utilize pre-existing or dynamically created evidence data sets. An evidence data set may comprise one or more natural language texts, in which certain aspects and their respective polarities are marked up. In an illustrative example, such an evidence data set may be created or updated by a GUI employed to accept a user input highlighting one or more adjacent words and associating them with an aspect term category and polarity.

In certain implementations, the classifier functions may be implemented by random forest classifiers. A random forest classifier operates by constructing a multitude of decision trees at training time and producing the class that is the mode of the classes or the mean prediction of the individual trees.

Alternatively, the classifier functions may implement various machine learning methods, such as linear classifiers, linear tree classifiers, random forest classifiers, conditional random field (CRF) classifiers, latent Dirichlet allocation (LDA) classifiers, support vector machine (SVM) classifiers, and/or neural network-based classifiers (such as Word2Vec). In an illustrative example, an SVM classifier may construct one or more dividing hyperplanes in a multidimensional space. The training set is used to determine the values of the hyperplane parameters, such that the resulting hyperplane would have the largest distance to the nearest training data point.

In various illustrative examples, one or more quality metrics may be employed to evaluate the classifier function quality. Such quality metric may be represented by the precision (positive predictive value) metric, the recall (sensitivity) metric, of the F-measure metric.

In certain implementations, the aspect-based sentiment analysis performed in accordance with one or more aspects of the present disclosure may be implemented as an interactive workflow, in which the user input is sought for providing the custom dictionary of various terms associated with the target entities (e.g., goods or services) and for validating the results of various operations of the method, as described in more details herein below with references to FIG. 7.

Figure 7:
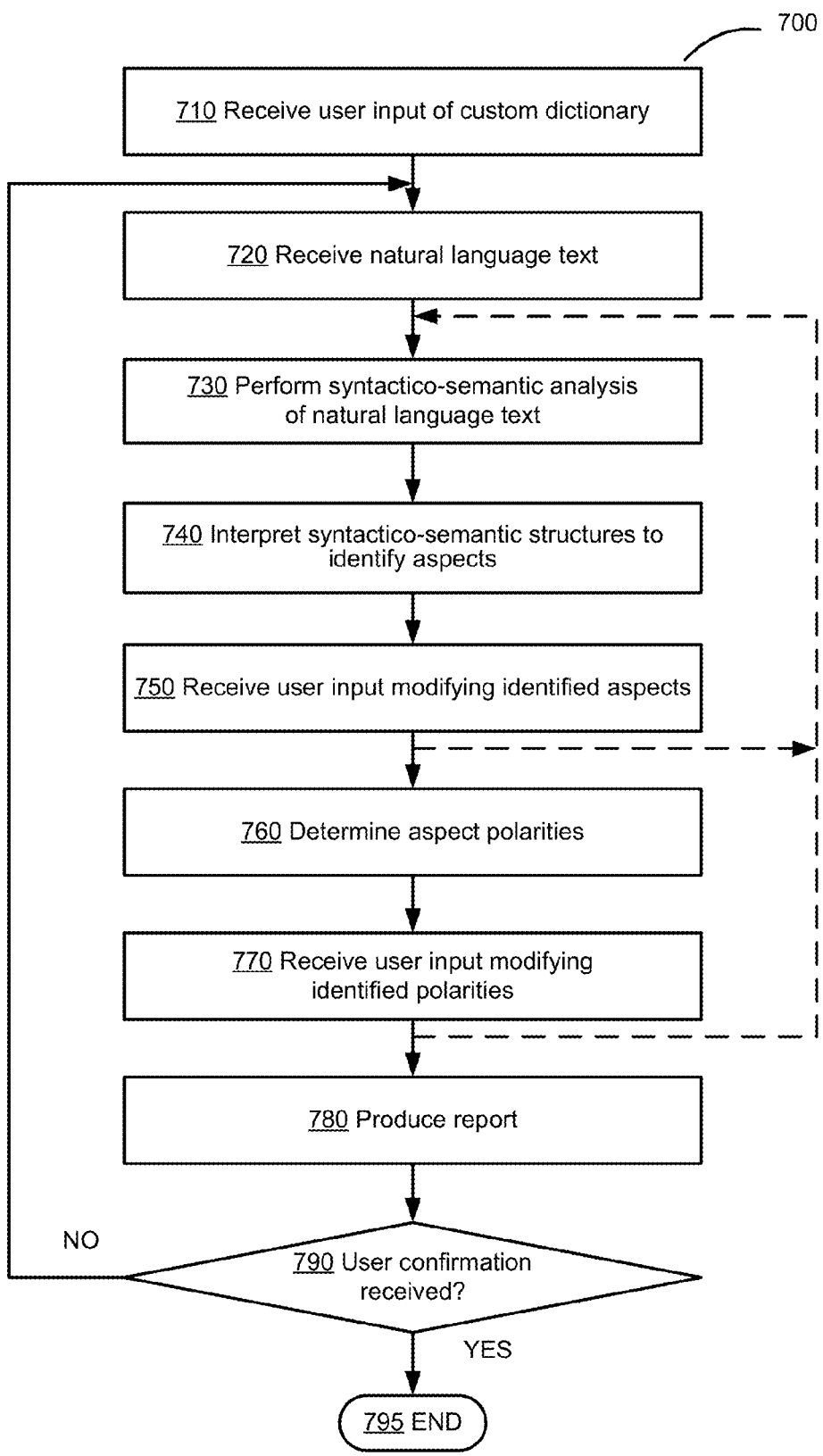
FIG. 7 depicts a flow diagram of an example method 700 for interactive aspect-based sentiment analysis of a natural language text, in accordance with one or more aspects of the present disclosure.

FIG. 7 depicts a flow diagram of an example method 700 for interactive aspect-based sentiment analysis of a natural language text, in accordance with one or more aspects of the present disclosure. Method 700 and/or each of its individual functions, routines, subroutines, or operations may be performed by one or more processors of the computer system (e.g., computer system 700 of FIG. 7) implementing the method. In certain implementations, method 700 may be performed by a single processing thread. Alternatively, method 700 may be performed by two or more processing threads, each thread implementing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. Therefore, while FIG. 7 and the associated description lists the operations of method 700 in certain order, various implementations of the method may perform at least some of the described operations in parallel and/or in arbitrary selected orders.

At block 710, the computer system implementing method 700 may receive an input specifying one or more lexemes that may be utilized in the natural language text being analyzed to refer to the target entities (e.g., consumer goods or services). In an illustrative example, the user dictionary may include a list of terms that may be used for referring to a particular make a model of a certain device (e.g., "iPhone 6", "the sixth-generation iPhone," "the latest model iPhone", etc.). Additionally or alternatively, the user input may specify one or more lexemes that that may be utilized in the natural language text being analyzed to refer to aspects of the target entities. The computer system may utilize the user dictionary to extend the semantic hierarchy which employed by the syntactico-semantic analysis of the natural language text, as described in more details herein above with references to FIG. 1.

At block 720, the computer system may receive a natural language text which may represent, e.g., one or more consumer reviews of the target entities (e.g., consumer goods or services).

At block 730, the computer system may perform a syntactico-semantic analysis of the input natural language text. The syntactico-semantic analysis may produce, for each sentence of the natural language text, at least one language-independent semantic structures, as described in more details herein below with references to FIGS. 5-15.

At block 740, the computer system may interpret the plurality of syntactico-semantic structures using a set of production rules to identify certain aspects of the target entities, as described in more details herein below with references to FIGS. 4-5.

At block 750, the computer system may receive the user input modifying the set of identified aspects. In an illustrative example, the user input may delete certain aspect terms that are not of interest to the user and/or certain incorrectly identified aspect terms. In an illustrative example, the user input may add certain aspect terms that were not identified but are of interest to the user. In yet another illustrative example, the user input may merge certain identified aspects that in the input natural language text may be referred to using various synonymic constructs. In yet another illustrative example, the user input may modify the hierarchical relationships among the identified aspects (e.g., the term "battery life" may be associated with the battery, rather than with the smartphone itself). In yet another illustrative example, the user input may modify the lexemes that can be used in the natural language text being analyzed to refer to the target entities and/or their aspects (e.g., the user input may define "brakes" as being associated with "brake pads" and "brake cylinders"). In certain implementations, responsive to receiving the user input, the method may loop back to block 730, as schematically illustrated by the dashed line.

At block 760, the computer system may determine polarities of the identified aspect terms. In an illustrative example, the polarity may be determined by applying a set of production rules that interpret a plurality of syntactico-semantic structures yielded by the syntactico-semantic analysis of the natural language text. Additionally or alternatively, the polarity may be determined by evaluating one or more classifier functions yielding the polarity of each identified aspect term, as described in more details herein below.

At block 770, the computer system may accept the user input modifying the identified aspect term polarities. In an illustrative example, the user input may modify the hierarchical relationships among the identified aspects and their polarities (e.g., the user input may associate the term "very expensive" with the price of the target device, rather than with the target device itself). In another illustrative example, the user input may modify the incorrectly identified polarity (e.g., the word "unpredictable" may reflect a positive sentiment with respect to a motion picture, but may at the same time reflect a negative sentiment with respect to a motor vehicle). In another illustrative example, the user input may specify additional aspect terms and/or their respective polarities (e.g., the user input may associate the term "smooth running" with the characteristic "driving comfort"). In certain implementations, responsive to receiving the user input, the method may loop back to block 730, as schematically illustrated by the dashed line.

At block 780, the computer system may aggregate the extracted information in a form suitable for rendering via a graphical user interface (GUI) and/or printing. In an illustrative example, the report generated by the system may comprise the identifier of the target entity (e.g., an electronic device), and one or more hierarchical lists identifying the components, characteristics, and/or functions of the target entity. Each hierarchical list may comprise a plurality of aspect terms and their associated polarities. In certain implementations, each hierarchical list may further comprise the number of instances (e.g., the number of online reviews), in which the identified aspect has been characterized by the identified aspect term and the identified polarity.

Responsive to receiving, at block 790, the user input accepting the generated report, the method may terminate at block 795. Otherwise, the computer system may accept the user input modifying the user dictionary, and the method may loop back to block 720.

In certain implementations, a same user dictionary may be utilized for analyzing natural language text associated with various target entities that share some characteristics (e.g., consumer products or services belonging to the same functional category, such as smartphones, motor vehicles, banking services, etc.). In an illustrative example, the system may employ the same user dictionary to evaluate and compare two different makes/models of a certain consumer product (e.g., a smartphone).

FIG. 8 illustrates an example natural language text for processing by the method for aspect-based sentiment analysis, in accordance with one or more aspects of the present disclosure. The natural language text represents a consumer review of a recently acquired motor vehicle.

FIG. 9 illustrates results of an example tagging of the text illustrated on FIG. 8, in accordance with one or more aspects of the present disclosure. The example tagging presents the aspects (e.g., general, drivability, comfort, costs, etc.), the corresponding aspects terms and their positions in the text, the identified polarities (e.g., negative, neutral, positive, and the identified aspect types (e.g., explicit, factual, implicit).

Figure 10:
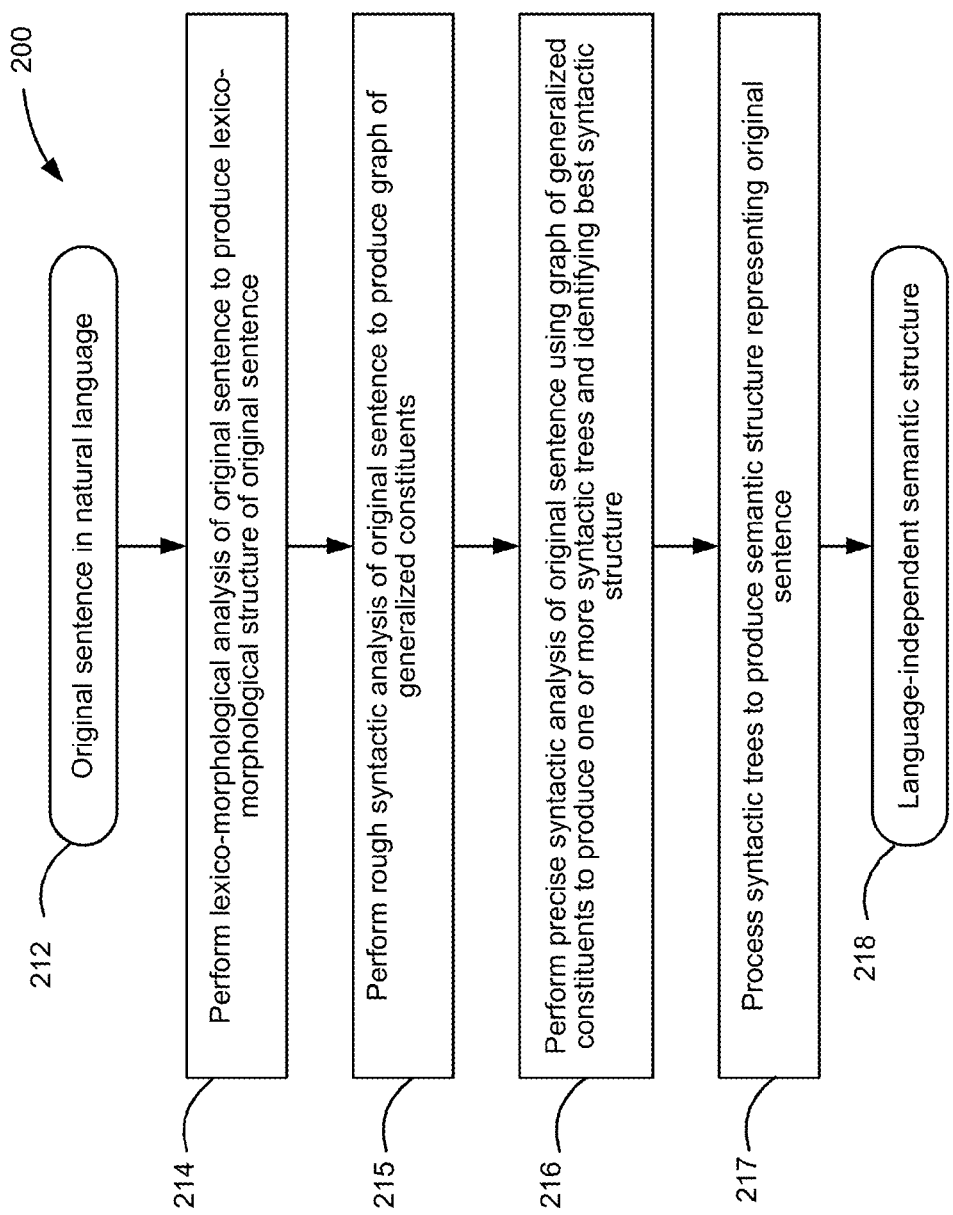
FIG. 10 depicts a flow diagram of an example method for performing a semantico-syntactic analysis of a natural language sentence, in accordance with one or more aspects of the present disclosure.

FIG. 10 depicts a flow diagram of an example of a method 200 for performing a semantico-syntactic analysis of a natural language sentence 212, in accordance with one or more aspects of the present disclosure. Method 200 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 200 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

At block 214, the computer system implementing the method may perform lexico-morphological analysis of sentence 212 to identify morphological meanings of the words comprised by the sentence. "Morphological meaning" of a word herein shall refer to one or more lemmas (i.e., canonical or dictionary forms) corresponding to the word and a corresponding set of values of grammatical attributes defining the grammatical value of the word. Such grammatical attributes may include the lexical category of the word and one or more morphological attributes (e.g., grammatical case, gender, number, conjugation type, etc.). Due to homonymy and/or coinciding grammatical forms corresponding to different lexico-morphological meanings of a certain word, two or more morphological meanings may be identified for a given word. An illustrative example of performing lexico-morphological analysis of a sentence is described in more details herein below with references to FIG. 11.

At block 215, the computer system may perform a rough syntactic analysis of sentence 212. The rough syntactic analysis may include identification of one or more syntactic models which may be associated with sentence 212 followed by identification of the surface (i.e., syntactic) associations within sentence 212, in order to produce a graph of generalized constituents. "Constituent" herein shall refer to a contiguous group of words of the original sentence, which behaves as a single grammatical entity. A constituent comprises a core represented by one or more words, and may further comprise one or more child constituents at lower levels. A child constituent is a dependent constituent and may be associated with one or more parent constituents.

At block 216, the computer system may perform a precise syntactic analysis of sentence 212, to produce one or more syntactic trees of the sentence. The pluralism of possible syntactic trees corresponding to a given original sentence may stem from homonymy and/or coinciding grammatical forms corresponding to different lexico-morphological meanings of one or more words within the original sentence. Among the multiple syntactic trees, one or more best syntactic tree corresponding to sentence 212 may be selected, based on a certain rating function talking into account compatibility of lexical meanings of the original sentence words, surface relationships, deep relationships, etc.

At block 217, the computer system may process the syntactic trees to the produce a semantic structure 218 corresponding to sentence 212. Semantic structure 218 may comprise a plurality of nodes corresponding to semantic classes, and may further comprise a plurality of edges corresponding to semantic relationships, as described in more details herein below.

FIG. 11 schematically illustrates an example of a lexico-morphological structure of a sentence, in accordance with one or more aspects of the present disclosure. Example lexical-morphological structure 300 may comprise a plurality of "lexical meaning-grammatical value" pairs for example sentence. In an illustrative example, "ll" may be associated with lexical meaning "shall" 312 and "will" 314. The grammatical value associated with lexical meaning 312 is <Verb, GTVerbModal, ZeroType, Present, Nonnegative, Composite II>. The grammatical value associated with lexical meaning 314 is <Verb, GTVerbModal, ZeroType, Present, Nonnegative, Irregular, Composite II>.

Figure 12:
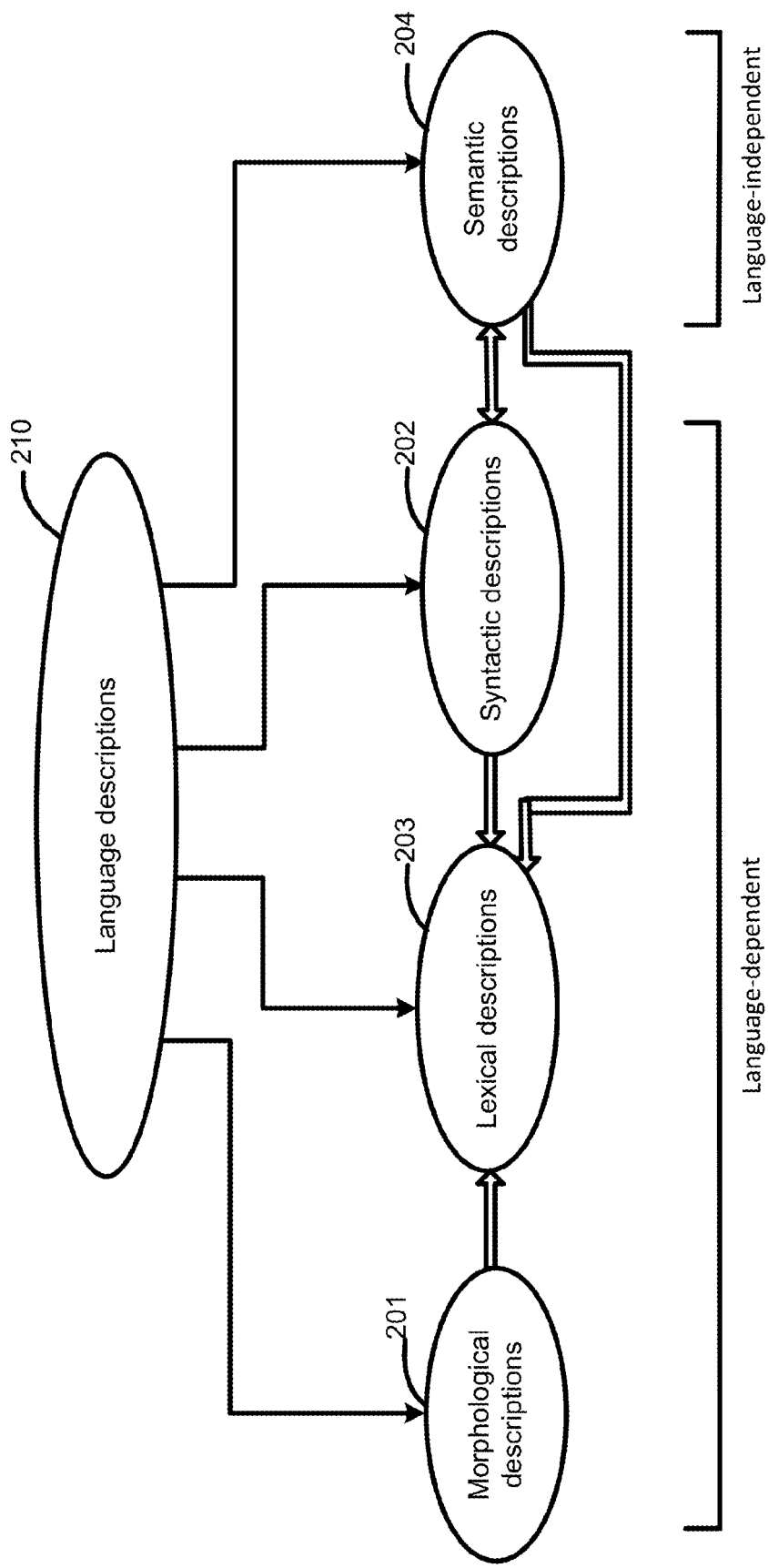
FIG. 12 schematically illustrates language descriptions representing a model of a natural language, in accordance with one or more aspects of the present disclosure.

FIG. 12 schematically illustrates language descriptions 210 including morphological descriptions 201, lexical descriptions 203, syntactic descriptions 202, and semantic descriptions 204, and their relationship thereof. Among them, morphological descriptions 201, lexical descriptions 203, and syntactic descriptions 202 are language-specific. A set of language descriptions 210 represent a model of a certain natural language.

In an illustrative example, a certain lexical meaning of lexical descriptions 203 may be associated with one or more surface models of syntactic descriptions 202 corresponding to this lexical meaning. A certain surface model of syntactic descriptions 202 may be associated with a deep model of semantic descriptions 204.

Figure 13:
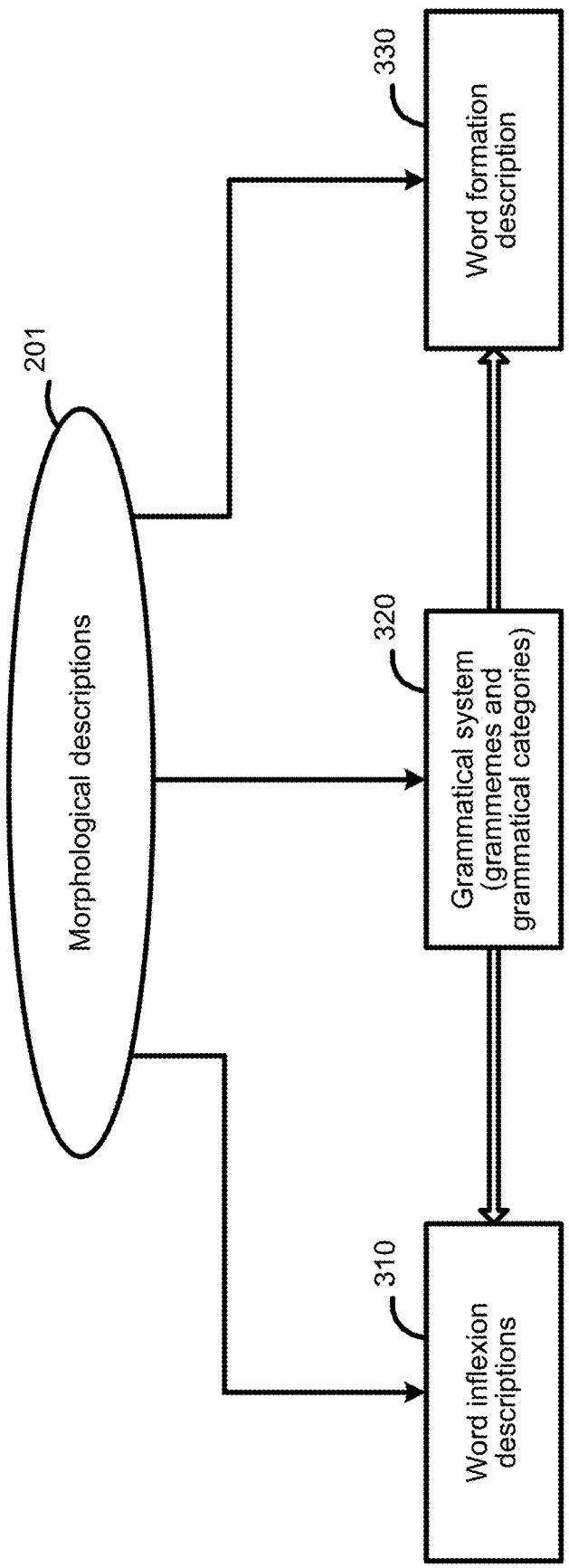
FIG. 13 schematically illustrates examples of morphological descriptions, in accordance with one or more aspects of the present disclosure.

FIG. 13 schematically illustrates several examples of morphological descriptions. Components of the morphological descriptions 201 may include: word inflexion descriptions 310, grammatical system 320, and word formation description 330, among others. Grammatical system 320 comprises a set of grammatical categories, such as, part of speech, grammatical case, grammatical gender, grammatical number, grammatical person, grammatical reflexivity, grammatical tense, grammatical aspect, and their values (also referred to as "grammemes"), including, for example, adjective, noun, or verb; nominative, accusative, or genitive case; feminine, masculine, or neutral gender; etc. The respective grammemes may be utilized to produce word inflexion description 310 and the word formation description 330.

Word inflexion descriptions 310 describe the forms of a given word depending upon its grammatical categories (e.g., grammatical case, grammatical gender, grammatical number, grammatical tense, etc.), and broadly includes or describes various possible forms of the word. Word formation description 330 describes which new words may be constructed based on a given word (e.g., compound words).

According to one aspect of the present disclosure, syntactic relationships among the elements of the original sentence may be established using a constituent model. A constituent may comprise a group of neighboring words in a sentence that behaves as a single entity. A constituent has a word at its core and may comprise child constituents at lower levels. A child constituent is a dependent constituent and may be associated with other constituents (such as parent constituents) for building the syntactic descriptions 202 of the original sentence.

Figure 14:
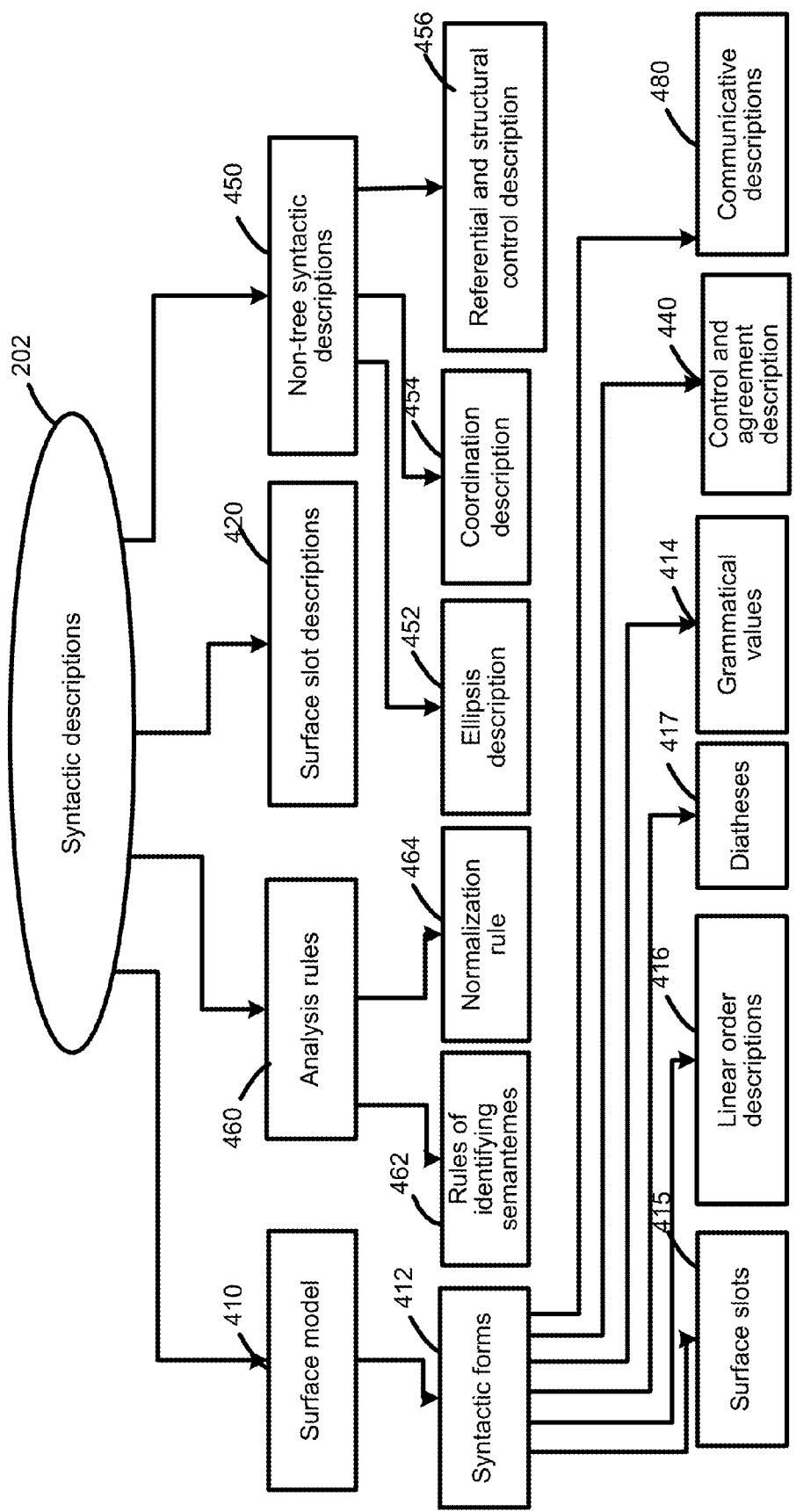
FIG. 14 schematically illustrates examples of syntactic descriptions, in accordance with one or more aspects of the present disclosure.

FIG. 14 illustrates exemplary syntactic descriptions. The components of the syntactic descriptions 202 may include, but are not limited to, surface models 410, surface slot descriptions 420, referential and structural control description 456, control and agreement description 440, non-tree syntactic description 450, and analysis rules 460. Syntactic descriptions 102 may be used to construct possible syntactic structures of the original sentence in a given natural language, taking into account free linear word order, non-tree syntactic phenomena (e.g., coordination, ellipsis, etc.), referential relationships, and other considerations.

Surface models 410 may be represented as aggregates of one or more syntactic forms ("syntforms" 412) employed to describe possible syntactic structures of the sentences that are comprised by syntactic description 102. In general, the lexical meaning of a natural language word may be linked to surface (syntactic) models 410. A surface model may represent constituents which are viable when the lexical meaning functions as the "core." A surface model may include a set of surface slots of the child elements, a description of the linear order, and/or diatheses. "Diathesis" herein shall refer to a certain relationship between an actor (subject) and one or more objects, having their syntactic roles defined by morphological and/or syntactic means. In an illustrative example, a diathesis may be represented by a voice of a verb: when the subject is the agent of the action, the verb is in the active voice, and when the subject is the target of the action, the verb is in the passive voice.

Figure 16:
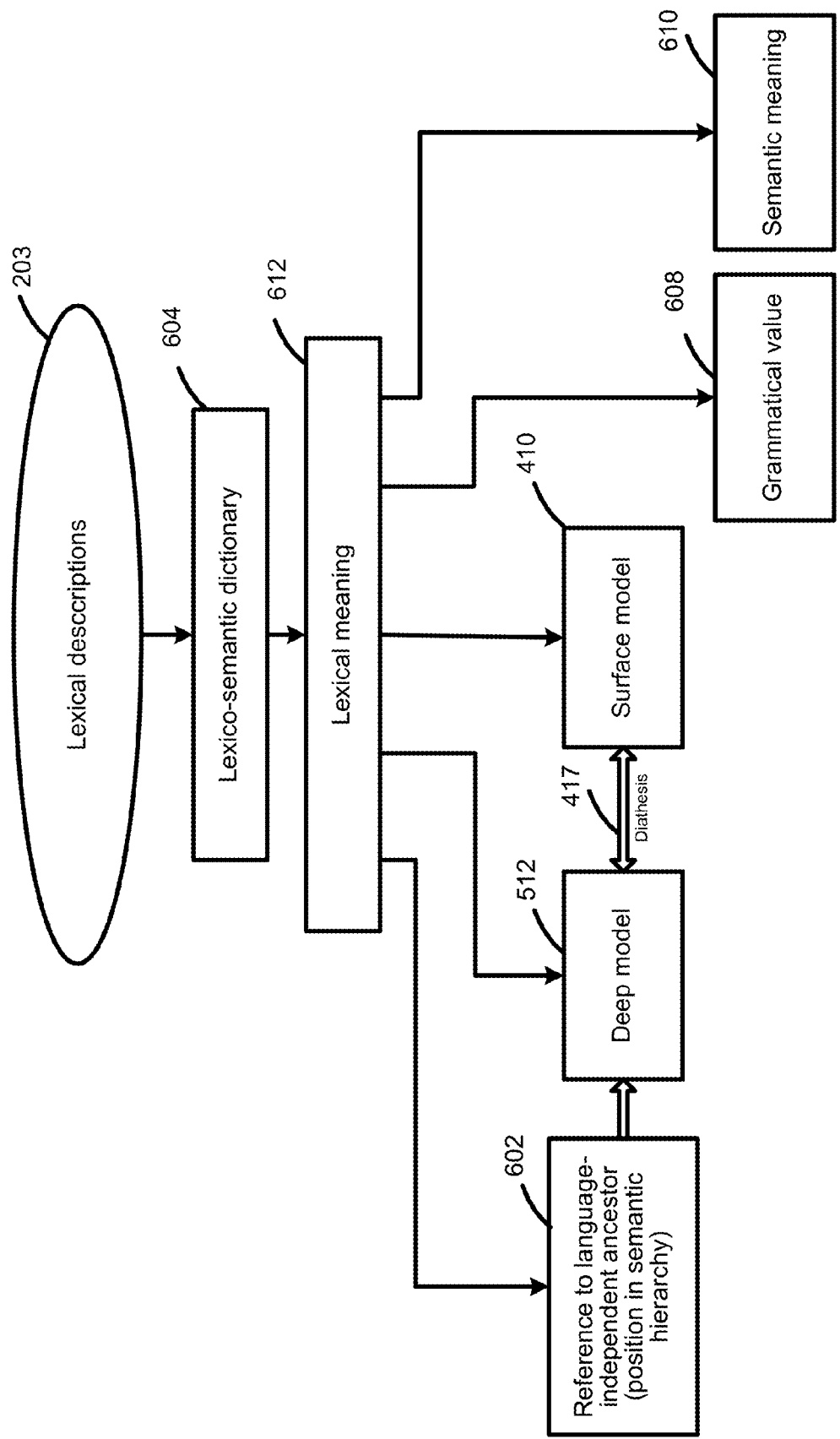
FIG. 16 schematically illustrates examples of lexical descriptions, in accordance with one or more aspects of the present disclosure.

A constituent model may utilize a plurality of surface slots 415 of the child constituents and their linear order descriptions 416 to describe grammatical values 414 of possible fillers of these surface slots. Diatheses 417 may represent relationships between surface slots 415 and deep slots 514 (as shown in FIG. 16). Communicative descriptions 480 describe communicative order in a sentence.

Linear order description 416 may be represented by linear order expressions reflecting the sequence in which various surface slots 415 may appear in the sentence. The linear order expressions may include names of variables, names of surface slots, parenthesis, grammemes, ratings, the "or" operator, etc. In an illustrative example, a linear order description of a simple sentence of "Boys play football" may be represented as "Subject Core Object_Direct," where Subject, Core, and Object_Direct are the names of surface slots 415 corresponding to the word order.

Communicative descriptions 480 may describe a word order in a syntform 412 from the point of view of communicative acts that are represented as communicative order expressions, which are similar to linear order expressions. The control and concord description 440 may comprise rules and restrictions which are associated with grammatical values of the related constituents and may be used in performing syntactic analysis.

Non-tree syntax descriptions 450 may be created to reflect various linguistic phenomena, such as ellipsis and coordination, and may be used in syntactic structures transformations which are generated at various stages of the analysis according to one or more aspects of the present disclosure. Non-tree syntax descriptions 450 may include ellipsis description 452, coordination description 454, as well as referential and structural control description 430, among others.

Analysis rules 460 may generally describe properties of a specific language and may be used in performing the semantic analysis. Analysis rules 460 may comprise rules of identifying semantemes 462 and normalization rules 464. Normalization rules 464 may be used for describing language-dependent transformations of semantic structures.

Figure 15:
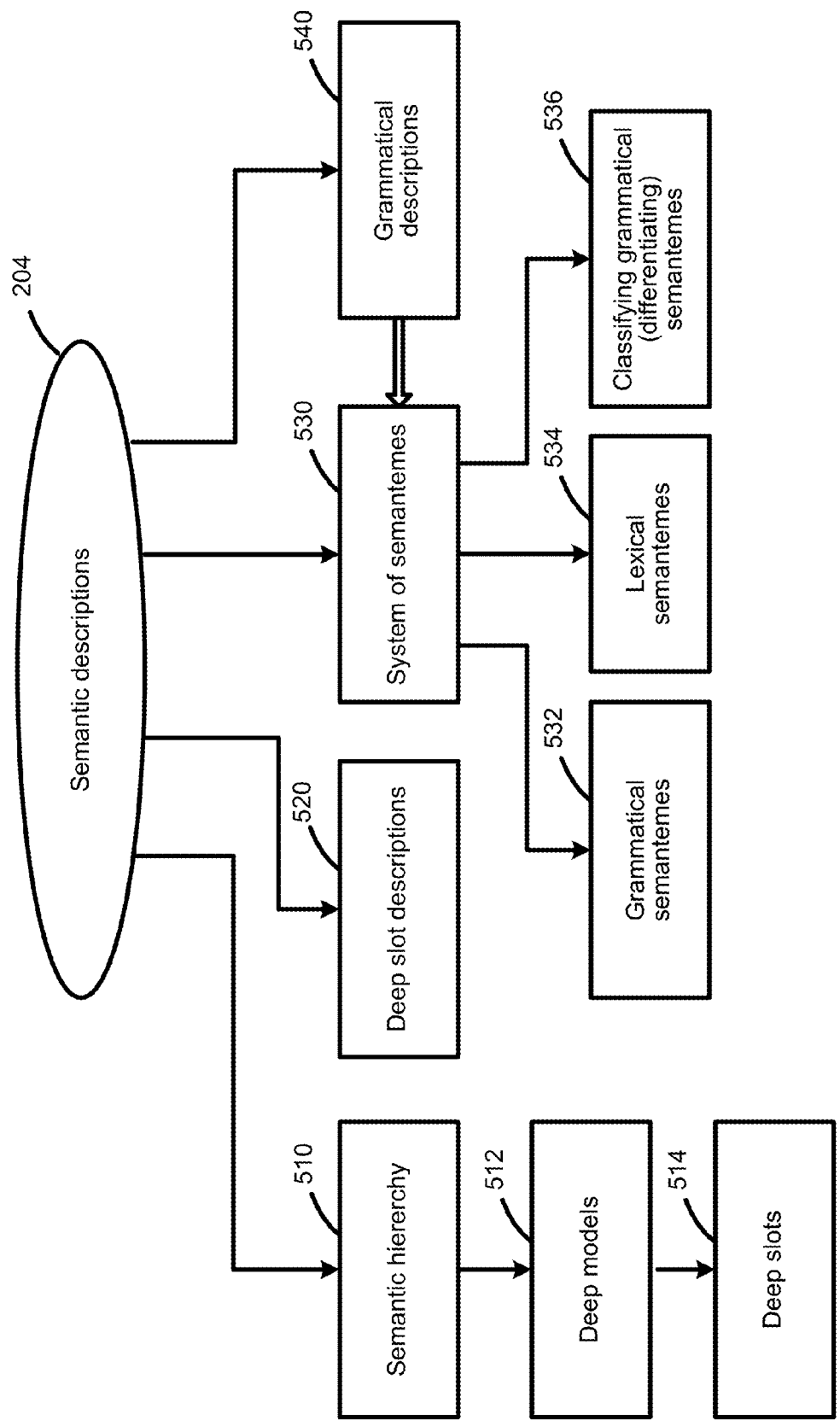
FIG. 15 schematically illustrates examples of semantic descriptions, in accordance with one or more aspects of the present disclosure.

FIG. 15 illustrates exemplary semantic descriptions. Components of semantic descriptions 204 are language-independent and may include, but are not limited to, a semantic hierarchy 510, deep slots descriptions 520, a set of semantemes 530, and pragmatic descriptions 540.

The core of the semantic descriptions may be represented by semantic hierarchy 510 which may comprise semantic notions (semantic entities) which are also referred to as semantic classes. The latter may be arranged into hierarchical structure reflecting parent-child relationships. In general, a child semantic class may inherits one or more properties of its direct parent and other ancestor semantic classes. In an illustrative example, semantic class SUBSTANCE is a child of semantic class ENTITY and the parent of semantic classes GAS, LIQUID, METAL, WOOD_MATERIAL, etc.

Each semantic class in semantic hierarchy 510 may be associated with a corresponding deep model 512. Deep model 512 of a semantic class may comprise a plurality of deep slots 514 which may reflect semantic roles of child constituents in various sentences that include objects of the semantic class as the core of the parent constituent. Deep model 512 may further comprise possible semantic classes acting as fillers of the deep slots. Deep slots 514 may express semantic relationships, including, for example, "agent,"

"addressee," "instrument," "quantity," etc. A child semantic class may inherit and further expand the deep model of its direct parent semantic class.

Deep slots descriptions 520 reflect semantic roles of child constituents in deep models 512 and may be used to describe general properties of deep slots 514. Deep slots descriptions 520 may also comprise grammatical and semantic restrictions associated with the fillers of deep slots 514. Properties and restrictions associated with deep slots 514 and their possible fillers in various languages may be substantially similar and often identical. Thus, deep slots 514 are language-independent.

System of semantemes 530 may represents a plurality of semantic categories and semantemes which represent meanings of the semantic categories. In an illustrative example, a semantic category "DegreeOfComparison" may be used to describe the degree of comparison and may comprise the following semantemes: "Positive," "ComparativeHigherDegree," and "SuperlativeHighestDegree," among others. In another illustrative example, a semantic category "RelationToReferencePoint" may be used to describe an order (spatial or temporal in a broad sense of the words being analyzed), such as before or after a reference point, and may comprise the semantemes "Previous" and "Subsequent.". In yet another illustrative example, a semantic category "EvaluationObjective" can be used to describe an objective assessment, such as "Bad," "Good," etc.

System of semantemes 530 may include language-independent semantic attributes which may express not only semantic properties but also stylistic, pragmatic and communicative properties. Certain semantemes may be used to express an atomic meaning which corresponds to a regular grammatical and/or lexical expression in a natural language. By their intended purpose and usage, sets of semantemes may be categorized, e.g., as grammatical semantemes 532, lexical semantemes 534, and classifying grammatical (differentiating) semantemes 536.

Grammatical semantemes 532 may be used to describe grammatical properties of the constituents when transforming a syntactic tree into a semantic structure. Lexical semantemes 534 may describe specific properties of objects (e.g., "being flat" or "being liquid") and may be used in deep slot descriptions 520 as restriction associated with the deep slot fillers (e.g., for the verbs "face (with)" and "flood," respectively). Classifying grammatical (differentiating) semantemes 536 may express the differentiating properties of objects within a single semantic class. In an illustrative example, in the semantic class of HAIRDRESSER, the semanteme of <<RelatedToMen>> is associated with the lexical meaning of "barber," to differentiate from other lexical meanings which also belong to this class, such as "hairdresser," "hairstylist," etc. Using these language-independent semantic properties that may be expressed by elements of semantic description, including semantic classes, deep slots, and semantemes, may be employed for extracting the semantic information, in accordance with one or more aspects of the present invention.

Pragmatic descriptions 540 allow associating a certain theme, style or genre to texts and objects of semantic hierarchy 510 (e.g., "Economic Policy," "Foreign Policy," "Justice," "Legislation," "Trade," "Finance," etc.). Pragmatic properties may also be expressed by semantemes. In an illustrative example, the pragmatic context may be taken into consideration during the semantic analysis phase.

FIG. 16 illustrates exemplary lexical descriptions. Lexical descriptions 203 represent a plurality of lexical meanings 612, in a certain natural language, for each component of a sentence. For a lexical meaning 612, a relationship 602 to its language-independent semantic parent may be established to indicate the location of a given lexical meaning in semantic hierarchy 510.

A lexical meaning 612 of lexical-semantic hierarchy 510 may be associated with a surface model 410 which, in turn, may be associated, by one or more diatheses 417, with a corresponding deep model 512. A lexical meaning 612 may inherit the semantic class of its parent, and may further specify its deep model 512.

A surface model 410 of a lexical meaning may comprise includes one or more syntforms 412. A syntform, 412 of a surface model 410 may comprise one or more surface slots 415, including their respective linear order descriptions 416, one or more grammatical values 414 expressed as a set of grammatical categories (grammemes), one or more semantic restrictions associated with surface slot fillers, and one or more of the diatheses 417. Semantic restrictions associated with a certain surface slot filler may be represented by one or more semantic classes, whose objects can fill the surface slot.

Figure 17:
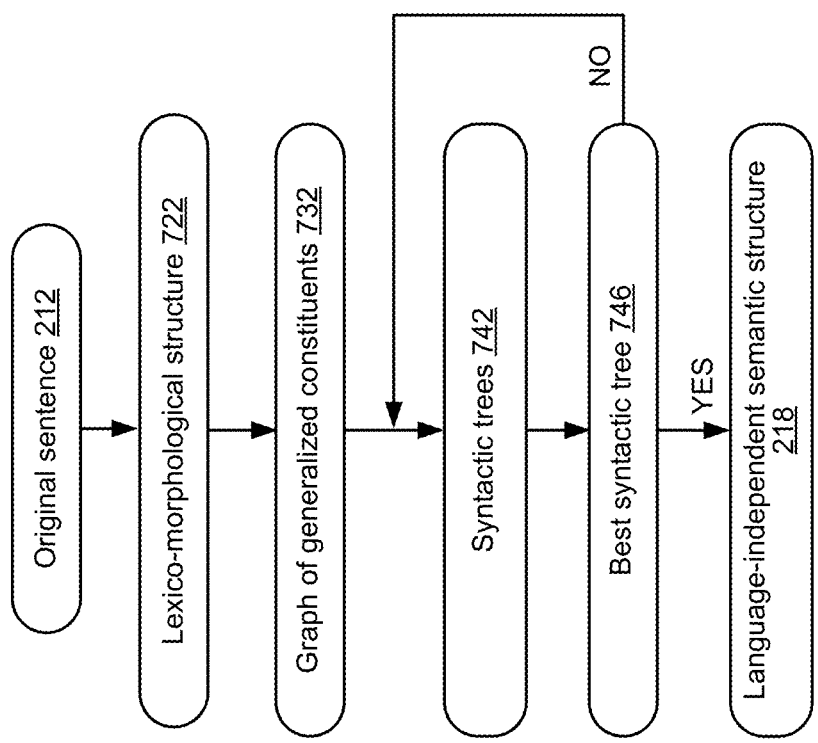
FIG. 17 schematically illustrates example data structures that may be employed by one or more methods implemented in accordance with one or more aspects of the present disclosure.

FIG. 17 schematically illustrates example data structures that may be employed by one or more methods described herein. Referring again to FIG. 10, at block 214, the computer system implementing the method may perform lexico-morphological analysis of sentence 212 to produce a lexico-morphological structure 722 of FIG. 17. Lexico-morphological structure 722 may comprise a plurality of mapping of a lexical meaning to a grammatical value for each lexical unit (e.g., word) of the original sentence. FIG. 11 schematically illustrates an example of a lexico-morphological structure.

Referring again to FIG. 10, at block 215, the computer system may perform a rough syntactic analysis of original sentence 212, in order to produce a graph of generalized constituents 732 of FIG. 17. Rough syntactic analysis involves applying one or more possible syntactic models of possible lexical meanings to each element of a plurality of elements of the lexico-morphological structure 722, in order to identify a plurality of potential syntactic relationships within original sentence 212, which are represented by graph of generalized constituents 732.

Graph of generalized constituents 732 may be represented by an acyclic graph comprising a plurality of nodes corresponding to the generalized constituents of original sentence 212, and further comprising a plurality of edges corresponding to the surface (syntactic) slots, which may express various types of relationship among the generalized lexical meanings. The method may apply a plurality of potentially viable syntactic models for each element of a plurality of elements of the lexico-morphological structure of original sentence 212 in order to produce a set of core constituents of original sentence 212. Then, the method may consider a plurality of viable syntactic models and syntactic structures of original sentence 212 in order to produce graph of generalized constituents 732 based on a set of constituents. Graph of generalized constituents 732 at the level of the surface model may reflect a plurality of viable relationships among the words of original sentence 212. As the number of viable syntactic structures may be relatively large, graph of generalized constituents 732 may generally comprise redundant information, including relatively large numbers of lexical meaning for certain nodes and/or surface slots for certain edges of the graph.

Graph of generalized constituents 732 may be initially built as a tree, starting with the terminal nodes (leaves) and moving towards the root, by adding child components to fill surface slots 415 of a plurality of parent constituents in order to reflect all lexical units of original sentence 212.

Figure 18:
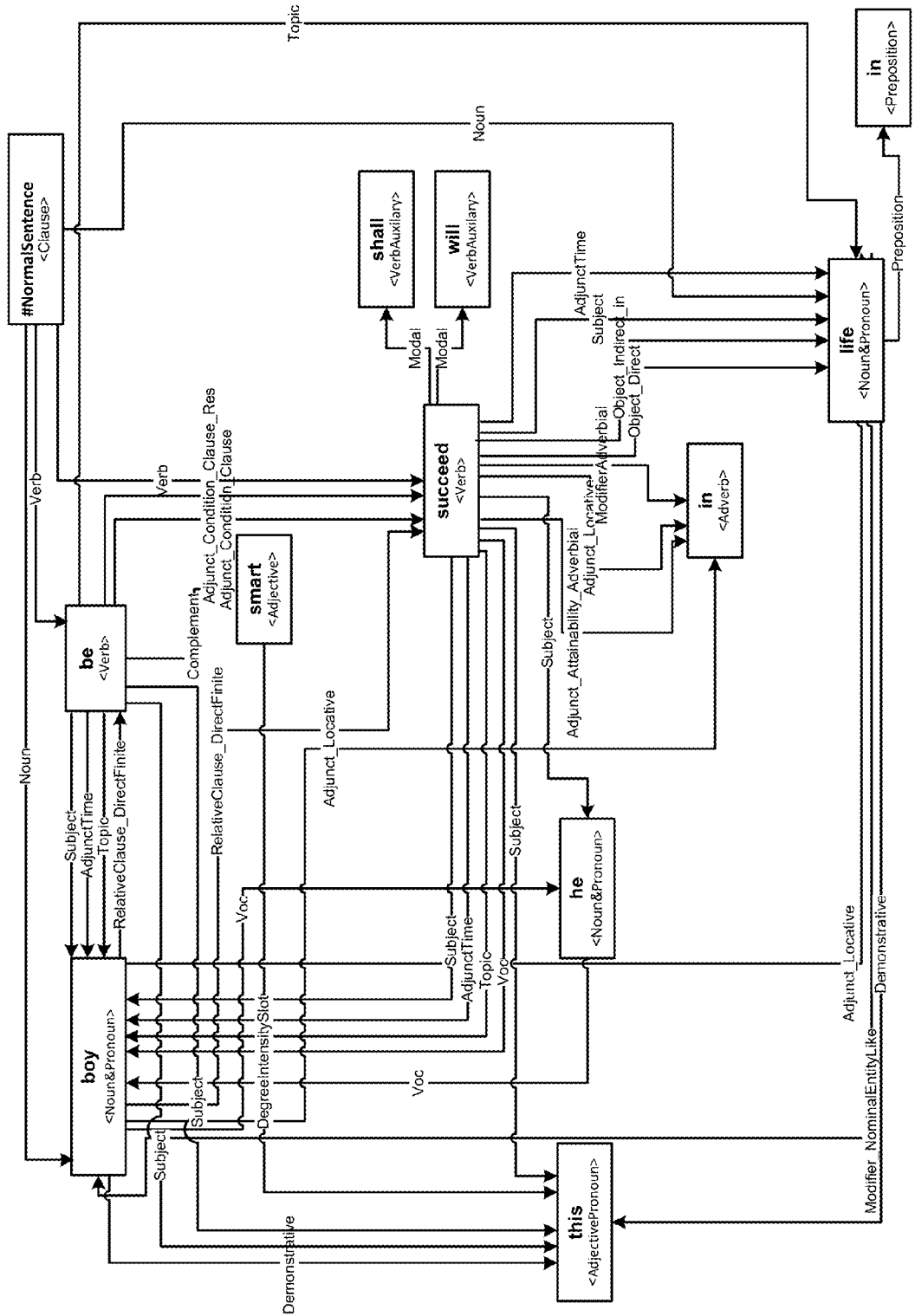
FIG. 18 schematically illustrates an example graph of generalized constituents, in accordance with one or more aspects of the present disclosure.

In certain implementations, the root of graph of generalized constituents 732 represents a predicate. In the course of the above described process, the tree may become a graph, as certain constituents of a lower level may be included into one or more constituents of an upper level. A plurality of constituents that represent certain elements of the lexico-morphological structure may then be generalized to produce generalized constituents. The constituents may be generalized based on their lexical meanings or grammatical values 414, e.g., based on part of speech designations and their relationships. FIG. 18 schematically illustrates an example graph of generalized constituents.

At block 216, the computer system may perform a precise syntactic analysis of sentence 212, to produce one or more syntactic trees 742 of FIG. 17 based on graph of generalized constituents 732. For each of one or more syntactic trees, the computer system may determine a general rating based on certain calculations and a priori estimates. The tree having the optimal rating may be selected for producing the best syntactic structure 746 of original sentence 212.

In the course of producing the syntactic structure 746 based on the selected syntactic tree, the computer system may establish one or more non-tree links (e.g., by producing redundant path between at least two nodes of the graph). If that process fails, the computer system may select a syntactic tree having a suboptimal rating closest to the optimal rating, and may attempt to establish one or more non-tree relationships within that tree. Finally, the precise syntactic analysis produces a syntactic structure 746 which represents the best syntactic structure corresponding to original sentence 212. In fact, selecting the best syntactic structure 746 also produces the best lexical values 240 of original sentence 212.

At block 217, the computer system may process the syntactic trees to the produce a semantic structure 218 corresponding to sentence 212. Semantic structure 218 may reflect, in language-independent terms, the semantics conveyed by original sentence. Semantic structure 218 may be represented by an acyclic graph (e.g., a tree complemented by at least one non-tree link, such as an edge producing a redundant path among at least two nodes of the graph). The original natural language words are represented by the nodes corresponding to language-independent semantic classes of semantic hierarchy 510. The edges of the graph represent deep (semantic) relationships between the nodes. Semantic structure 218 may be produced based on analysis rules 460, and may involve associating, one or more attributes (reflecting lexical, syntactic, and/or semantic properties of the words of original sentence 212) with each semantic class.

Figure 19:
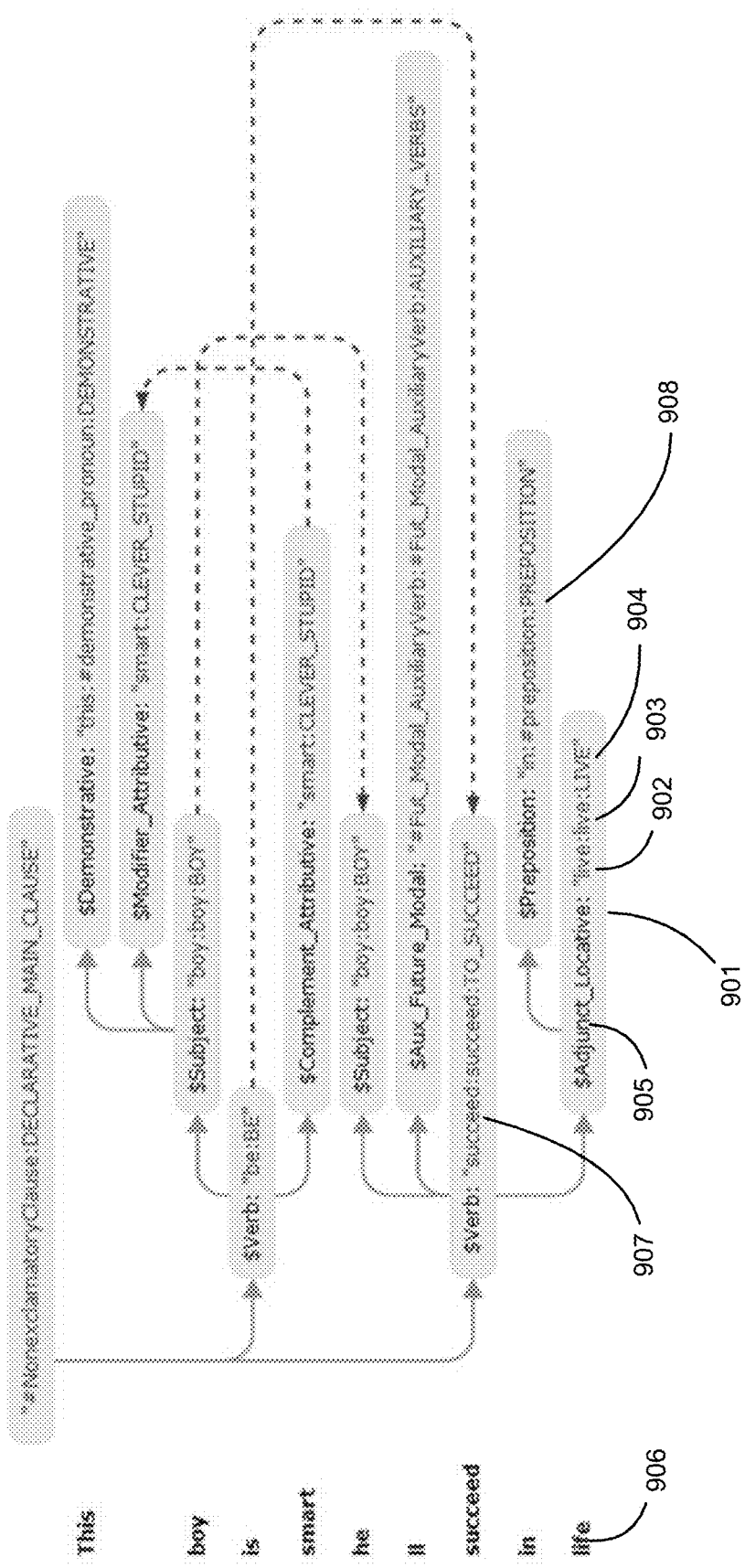
FIG. 19 illustrates an example syntactic structure corresponding to the sentence illustrated by FIG. 18.

FIG. 19 illustrates an example syntactic structure of a sentence derived from the graph of generalized constituents illustrated by FIG. 18. Node 901 corresponds to the lexical element "life" 906 in original sentence 212. By applying the method of syntactico-semantic analysis described herein, the computer system may establish that lexical element "life" 906 represents one of the lexemes of a derivative form "live" 902 associated with a semantic class "LIVE" 904, and fills in a surface slot $Adjunctr_Locative (905) of the parent constituent, which is represented by a controlling node $Verb:succeed:succeed:TO_SUCCEED (907).

Figure 20:
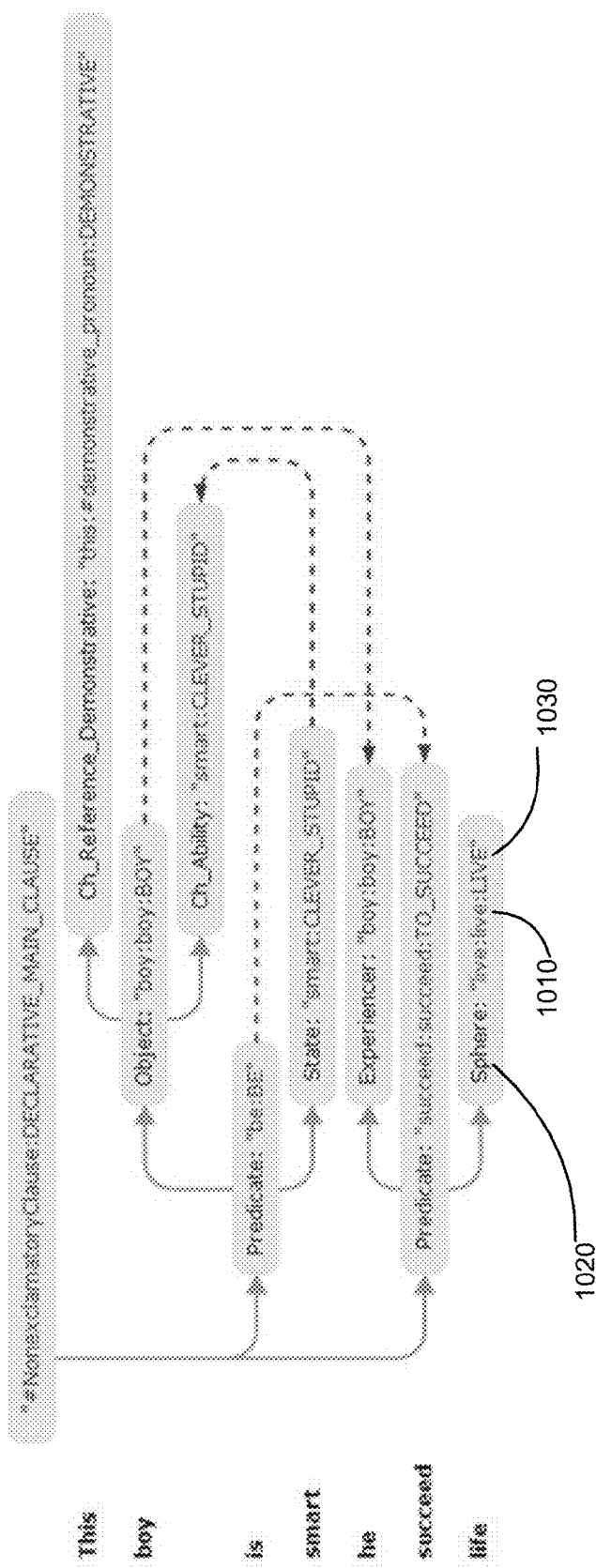
FIG. 20 illustrates a semantic structure corresponding to the syntactic structure of FIG. 19.

FIG. 20 illustrates a semantic structure corresponding to the syntactic structure of FIG. 19. With respect to the above referenced lexical element "life" 906 of FIG. 19, the semantic structure comprises lexical class 1010 and semantic classes 1030 similar to those of FIG. 19, but instead of surface slot 905, the semantic structure comprises a deep slot "Sphere" 1020.

In accordance with one or more aspects of the present disclosure, the computer system implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of syntactic and semantic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each semantic structure. An index may be represented by a memory data structure, such as a table, comprising a plurality of entries. Each entry may represent a mapping of a certain semantic structure element (e.g., one or more words, a syntactic relationship, a morphological, lexical, syntactic or semantic attribute, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more details herein. The index may be employed in various natural language processing tasks, including the task of performing semantic search.

The computer system implementing the method may extract a wide spectrum of lexical, grammatical, syntactic, pragmatic, and/or semantic characteristics in the course of performing the syntactico-semantic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computer system implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computer system implementing the methods described herein may also store and index the syntactic and semantic structures produced by one or more text analysis methods described herein, for employing those structures and/or indexes in semantic search, classification, clustering, and document filtering.

Figure 21:
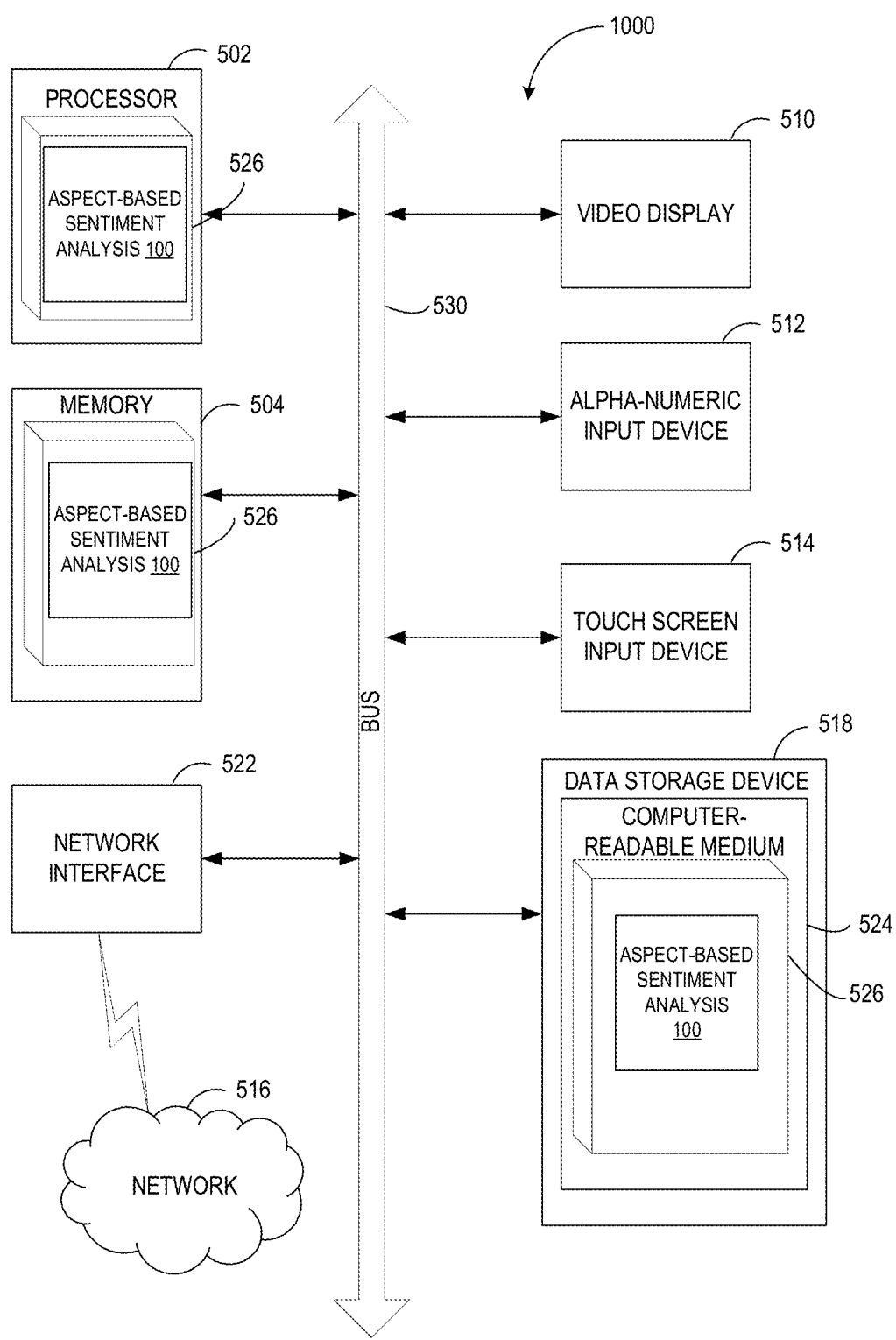
FIG. 21 depicts a diagram of an example computer system implementing the methods described herein.

FIG. 21 illustrates a diagram of an example computer system 1000 which may execute a set of instructions for causing the computer system to perform any one or more of the methods discussed herein. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose computer systems such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose computer systems such as an application specific integrated circuit (ASIC), a field programmable gate array (FPGA), a digital signal processor (DSP), network processor, or the like. Processor 502 is configured to execute instructions 526 for performing the operations and functions discussed herein.

Computer system 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computer system 1000, main memory 504 and processor 502 also constituting computer-readable storage media. Instructions 526 may further be transmitted or received over network 516 via network interface device 522.

In certain implementations, instructions 526 may include instructions of method 100 for performing aspect-based sentiment analysis, in accordance with one or more aspects of the present disclosure. While computer-readable storage medium 524 is shown in the example of FIG. 21 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising;
receiving, by a computer system, a custom dictionary comprising a list of lexemes referencing at least one of: a target entity or an aspect associated with the target entity;
performing, using the custom dictionary, a syntactico-semantic analysis of at least part of a natural language text to produce a plurality of syntactico-semantic structures representing the part of the natural language text;
interpreting the plurality of syntactico-semantic structures to detect, within the part of the natural language text, an aspect term representing an aspect associated with a target entity;
identifying, in the plurality of syntactico-semantic structures, a highest constituent having a kernel comprised by the aspect term;
evaluating a classifier function to determine a polarity associated with the aspect term, wherein a domain of the classifier function comprises one or more attributes of a context of the highest constituent; and
generating a report comprising the aspect term and the polarity of the aspect term.

2. The method of claim 1, wherein the natural language text represents a plurality of consumer reviews of the target entity.

3. The method of claim 1, wherein the target entity is represented by at least one of: a consumer product or a service.

4. The method of claim 1, wherein the polarity associated with the aspect term is represented by one of: a negative polarity, a neutral polarity, or a positive polarity.

5. The method of claim 1, wherein interpreting the syntactico-semantic structures is performed by applying a set of production rules.

6. The method of claim 5, further comprising:
receiving a user input modifying the identified aspects term.

7. The method of claim 1, further comprising:
receiving a user input modifying the identified polarity of the aspects term.

8. The method of claim 1, wherein the classifier function is represented by one of: a linear classifier, a linear tree classifier, a random forest classifier, a conditional random field (CRF) classifier, a latent Dirichlet allocation (LDA) classifier, a support vector machine (SVM) classifiers, or a neural network-based classifier.

9. The method of claim 1, further comprising:
determining, using a training data set, at least one parameter of the classifier function, wherein the training data set comprises a training natural language text comprising a plurality of aspect terms.

10. The method of claim 1, wherein each syntactico-semantic structure of the plurality of syntactico-semantic structures is represented by a graph comprising a plurality of nodes corresponding to a plurality of syntactico-semantic classes and a plurality of edges corresponding to a plurality of syntactico-semantic relationships.

11. The method of claim 1, further comprising:
producing the custom dictionary represented by a semantic hierarchy comprising definitions of a plurality of semantic classes.

12. The method of claim 1, wherein the aspect term represents one of: a function of the target entity or a component of the target entity.

13. A system, comprising:
a memory; and
a processor, coupled to the memory, the processor configured to:
receive a custom dictionary comprising a list of lexemes referencing at least one of: a target entity or an aspect associated with the target entity;
perform, using the custom dictionary, a syntactico-semantic analysis of at least part of a natural language text to produce a plurality of syntactico-semantic structures representing the part of the natural language text;
interpret the plurality of syntactico-semantic structures to detect, within the part of the natural language text, an aspect term representing an aspect associated with a target entity;
identifying, in the plurality of syntactico-semantic structures, a highest constituent having a kernel comprised by the aspect term;
evaluate a classifier function to determine a polarity associated with the aspect term, wherein a domain of the classifier function comprises one or more attributes of a context of the highest constituent; and
generate a report comprising the aspect term and the polarity of the aspect term.

14. The system of claim 13, wherein the polarity associated with the aspect term is represented by one of: a negative polarity, a neutral polarity, or a positive polarity.

15. The system of claim 13, wherein interpreting the syntactico-semantic structures is performed by applying a set of production rules.

16. The system of claim 15, wherein the processor is further configured to:
receive a user input modifying the identified aspects term.

17. The system of claim 13, wherein the processor is further configured to:
receive a user input modifying the identified polarity of the aspects term.

18. The system of claim 13, wherein the processor is further configured to:
determine, using a training data set, at least one parameter of the classifier function, wherein the training data set comprises a training natural language text comprising a plurality of aspect terms.

19. The system of claim 13, wherein the aspect term represents one of: a function of the target entity or a component of the target entity.

20. A computer-readable non-transitory storage medium comprising executable instructions that, when executed by a computer system, cause the computer system to:
receive a custom dictionary comprising a list of lexemes referencing at least one of: a target entity or an aspect associated with the target entity;
perform, using the custom dictionary, a syntactico-semantic analysis of at least part of a natural language text to produce a plurality of syntactico-semantic structures representing the part of the natural language text;
interpret the plurality of syntactico-semantic structures to detect, within the part of the natural language text, an aspect term representing an aspect associated with a target entity;
identify, in the plurality of syntactico-semantic structures, a highest constituent having a kernel comprised by the aspect term;

evaluate a classifier function determine a polarity associated with the aspect term, wherein a domain of the classifier function comprises one or more attributes of a context of the highest constituent; and generate a report comprising the aspect term and the polarity of the aspect term.

* * * * *